United States Patent
Cheraghi et al.

(10) Patent No.: US 11,997,336 B2
(45) Date of Patent: May 28, 2024

(54) SCHEDULING COMPRESSED VIDEO FRAME FOR IN-VEHICLE WIRELESS NETWORKS

(71) Applicant: QUALCOMM Incorporated, San Diego, CA (US)

(72) Inventors: Parisa Cheraghi, Cambridge (GB); Gene Wesley Marsh, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 17/320,881

(22) Filed: May 14, 2021

(65) Prior Publication Data

US 2022/0368972 A1 Nov. 17, 2022

(51) Int. Cl.
*H04N 21/262* (2011.01)
*H04N 5/917* (2006.01)
(Continued)

(52) U.S. Cl.
CPC ....... *H04N 21/26216* (2013.01); *H04N 5/917* (2013.01); *H04N 21/234381* (2013.01);
(Continued)

(58) Field of Classification Search
CPC ..... H04N 21/26216; H04N 21/234381; H04N 21/239; H04N 21/24; H04N 5/917; H04N 21/41422; H04N 21/4622
See application file for complete search history.

(56) References Cited

U.S. PATENT DOCUMENTS

| | | | | |
|---|---|---|---|---|
| 2002/0080267 A1* | 6/2002 | Moluf | ............... | H04N 21/2368 375/E7.278 |
| 2003/0215010 A1* | 11/2003 | Kashiwa | ............ | H04N 5/23206 348/E5.025 |

(Continued)

FOREIGN PATENT DOCUMENTS

WO    WO-2022179681 A1 *  9/2022
WO    WO-2022202179 A1 *  9/2022

OTHER PUBLICATIONS

International Search Report and Written Opinion—PCT/US2022/022221—ISA/EPO—Jul. 1, 2022.
(Continued)

*Primary Examiner* — Jefferey F Harold
*Assistant Examiner* — Alexander Boyd
(74) *Attorney, Agent, or Firm* — Procopio, Cory, Hargreaves & Savitch LLP

(57) ABSTRACT

A video stream scheduling unit may schedule resource allocations for each video frame of a plurality of video frames of video streams from a plurality of video sources based on a compressed frame type of the video frame, determine that a total frequency bandwidth of scheduled resource allocations for the frames concurrently due for transmission is greater than or equal to a threshold bandwidth, and receive the video streams from the plurality of video sources based on the scheduled resource allocations. The scheduling unit may delay or cancel a video frame with low priority or may instruct a video source to increase the compression rate of the video stream.

31 Claims, 9 Drawing Sheets

(51) Int. Cl.
    *H04N 21/2343*    (2011.01)
    *H04N 21/239*     (2011.01)
    *H04N 21/24*      (2011.01)
    *H04N 21/414*     (2011.01)
    *H04N 21/462*     (2011.01)

(52) U.S. Cl.
    CPC ........... *H04N 21/239* (2013.01); *H04N 21/24* (2013.01); *H04N 21/41422* (2013.01); *H04N 21/4622* (2013.01)

(56) References Cited

U.S. PATENT DOCUMENTS

| | | | |
|---|---|---|---|
| 2009/0141800 A1* | 6/2009 | Larson | H04N 21/2365 |
| | | | 375/240.12 |
| 2011/0182366 A1* | 7/2011 | Frojdh | H04N 21/21805 |
| | | | 375/240.26 |
| 2012/0294258 A1 | 11/2012 | Ray et al. | |
| 2013/0286879 A1 | 10/2013 | Eiarabawy et al. | |
| 2016/0295265 A1* | 10/2016 | Li | H04N 21/26216 |
| 2020/0106704 A1* | 4/2020 | Iwata | H04L 12/28 |
| 2021/0029725 A1 | 1/2021 | Liu et al. | |

OTHER PUBLICATIONS

Pudlewski S., et al., "Video Transmission Over Lossy Wireless Networks: a Cross-Layer Perspective", IEEE Journal of Selected Topics in Signal Processing, IEEE, US, vol. 9, No. 1, Feb. 1, 2015 (Feb. 1, 2015), pp. 6-21, XP011570738, ISSN: 1932-4553, DOI: 10.1109/JSTSP.2014.2342202, [retrieved on Jan. 20, 2015].

* cited by examiner

SCHEDULING COMPRESSED VIDEO FRAME FOR IN-VEHICLE WIRELESS NETWORKS

BACKGROUND

Technical Field

The present disclosure generally relates to communication systems, and more particularly, to a method and apparatus for scheduling compressed video frames for wireless networks.

Introduction

Vehicle system may include various processors and devices, and an in-vehicle network to interconnect the various processors and the devices. The in-vehicle network may include a wired network and/or a wireless network. The wired network may have less interference and latency. The wireless network may reduce the manufacturing cost and have flexible network configuration.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a video stream scheduling unit, and the video stream scheduling apparatus may be configured to schedule resource allocations for each video frame of a plurality of video frames of video streams from a plurality of video sources based on a compressed frame type of the video frame and receive the video streams from the plurality of video sources based on the scheduled resource allocations. The compressed frame type may include an intra-frame (I-frame), a predictive frame (P-frame), or a bi-directional frame (B-frame). In some aspects, the resource allocations may be scheduled to minimize a maximum sum of time-frequency resources associated with the resource allocations in each time slot of a set of time slots.

In some aspects, the video stream scheduling apparatus may be configured to schedule the resource allocations by determining that a first frame of a first video stream from a first video source and a second frame of a second video stream from a second video source are concurrently due for transmission, the first frame and the second frame having a same compressed frame type, and determining that the first video stream has a higher priority than the second video stream, and scheduling resource allocations for the first frame of the first video stream before the second frame of the second video stream based on the determination that the first video stream has a higher priority. In one aspect, the compressed frame type of the first frame and the second frame is each the I-frame. In some aspects, the video stream scheduling apparatus may determine the priorities of the first video stream and the second video stream based on at least one of a relative position of a vehicle; an operation of the vehicle including at least one of direction, velocity, or acceleration; an external environment of the vehicle including interference from other wireless devices; a location of the video source; a direction of reception of the video source relative to the vehicle; or a resolution of the video source.

In some aspects, the video stream scheduling apparatus may be configured to schedule the resource allocations by determining that a total of time-frequency resources of the scheduled resource allocations for a first frame of a first video stream from a first video source and a second frame of a second video stream from a second video source concurrently due for transmission is greater than or equal to a threshold, determining which one of the first frame and the second frame has a higher frame priority, and scheduling resource allocations for one of the first frame or the second frame that has the higher frame priority before the other of the first frame or the second frame that has a lower frame priority. In some aspects, the video stream scheduling apparatus may be configured to determine which one of the first frame and the second frame has a higher frame priority includes determining that the I-frame has a higher frame priority than the P-frame or the B-frame, and determining that the P-frame has a higher frame priority than the B-frame.

In one aspect, the video stream scheduling apparatus may be further configured to schedule the resource allocations for the first frame of the first video stream in a first time slot based on the determination that the first video stream has a higher priority than the second video stream, and schedule the resource allocations for the second frame of the second video stream at a second time slot after the first time slot based on the determination that the first video stream has a higher priority than the second video stream. In another aspect, the video stream scheduling apparatus may be further configured to cancel the transmission of the second frame of the second video stream based on the determination that the first video stream has a higher priority than the second video stream. In another aspect, the video stream scheduling apparatus may be configured to instruct the second video source to increase a video compression rate of the second video stream based on the determination that the first video stream has a higher priority.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
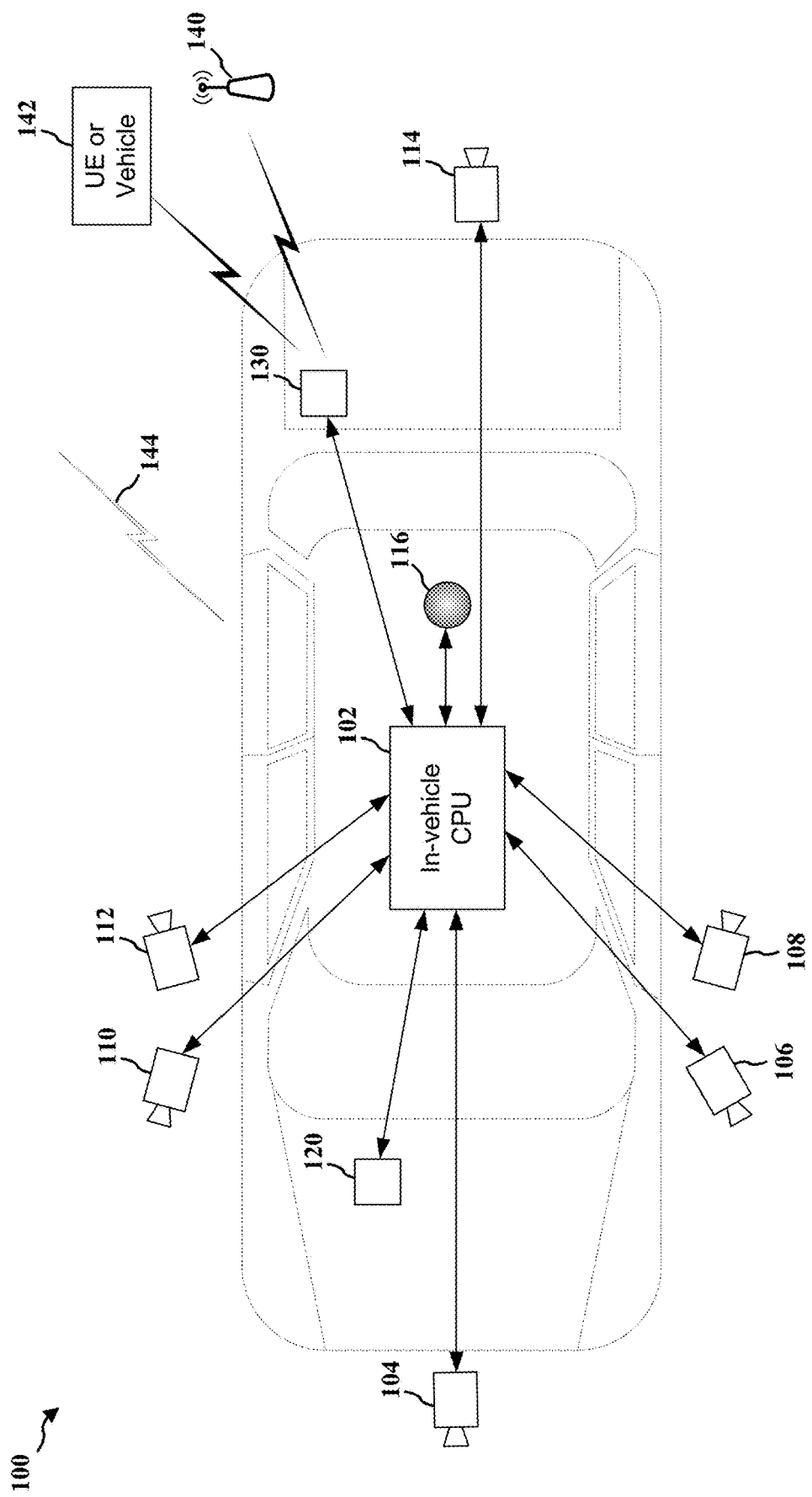
FIG. 1 is a diagram illustrating an example of an in-vehicle network for compressed video data transmission.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of an in-vehicle network 100 for compressed video data transmission. The example of the in-vehicle network 100 may include an in-vehicle CPU 102, a plurality of devices 104, 106, 108, 110, 112, 114, and 116, a component 120, and a communication module 130. The in-vehicle CPU 102 may include a full authority digital engine (or electronics) control (FADEC) including an engine control unit (ECU), an engine control module (ECM), a powertrain control module (PCM), an electronic engine management system (EEMS), an electronic engine control (EEC), an engine management system (EMS), a safety system, or an infotainment system. FIG. 1 illustrates one in-vehicle CPU 102, but the aspects of the disclosure are not limited thereto, and any number and combination of in-vehicle CPU 102 may be included in the in-vehicle network 100.

In some aspects, the in-vehicle CPU 102 may be connected to the component 120 on the vehicle, including, but not limited to, a motor, a sensor/actuator, a display, an electric meter, a pump, or any other similar functioning devices. FIG. 1 illustrates that the example of the in-vehicle network 100 includes one component 120, but the aspects of the disclosure are not limited thereto, and any number of components 120 may be included in the in-vehicle network 100.

In some aspects, the in-vehicle CPU 102 may include or be connected to the communication module 130 to wirelessly communicate with a base station 140 or another UE and/or vehicle 142. An example of a wireless communications system between the communication module 130 and the base station 140 or another UE and/or vehicle 142 may include any applicable form of wireless wide area network (WWAN) communication including 5G NR, LTE, LTE-A, sidelink communication, CDMA, GSM, and other wireless technologies. In one aspect, the in-vehicle CPU 102 may receive, from another UE and/or vehicle 142, scheduling information of another UE and/or vehicle 142 that may have adverse effects (e.g., interferences) on the in-vehicle network 100. In another aspect, the in-vehicle CPU 102 may receive, from another UE and/or vehicle 142, the operation information of another UE and/or vehicle 142 relative to the vehicle including the in-vehicle CPU 102. FIG. 1 illustrates that the example of in-vehicle network 100 includes one communication module 130, but the aspects of the disclosure are not limited thereto, and any number of communication modules 130 may be included in the in-vehicle network 100.

In some aspects, the in-vehicle CPU 102 may be connected to the plurality of devices 104, 106, 108, 110, 112, 114, and 116. The plurality of devices 104, 106, 108, 110, 112, 114, and 116 may be disposed at respective locations of the vehicle to face different directions of reception relative to the vehicle. For example, a first device 104 may be disposed at the front of the vehicle facing the front direction of the vehicle, a second device 106 and a third device 106 may be disposed at the left side of the vehicle facing the front and rear directions of the vehicle, respectively, a fourth device 110 and a fifth device 112 may be disposed at the right side of the vehicle facing the front and rear directions of the vehicle, respectively, a sixth device 114 may be disposed at the read side of the vehicle facing the rear direction of the vehicle, and a seventh device 116 may be disposed on the top side of the vehicle to acquire information from the surroundings of the vehicle. The seventh device 116, for example, may acquire a panoramic view of the surrounding environment, such as a 180-degree image or a 360-degree image.

The plurality of devices may include various sensors. The various sensors may include, but are not limited to, temperature sensors, proximity sensors, pressure sensors, position sensors, photoelectric sensors, motion sensors, humidity sensors, electrical sensors, remote sensors, etc. The remote sensors may include, but are not limited to, cameras, video streaming devices, sonic detection and ranging (SODAR) sensors, radio detection and ranging (RADAR) sensors, and light detection and ranging (LiDAR) sensors, etc. The remote sensors may generate a video stream of images and transmit the video stream to the in-vehicle CPU 102. The plurality of devices 104, 106, 108, 110, 112, 114, and 116 may be disposed to face respective directions. The aspects of the disclosure are not limited to the number and directions of the devices illustrated in FIG. 1, and any applicable number of devices may be provided to face respective directions.

The connection between the in-vehicle CPU 102 and the plurality of devices 104, 106, 108, 110, 112, 114, and 116, the component 120, and/or the communication module 130 may include one or more wired/wireless connections including, but not limited to, a Bluetooth, a wireless local area network (WLAN), a sidelink communication, etc.

Recent advances in automotive electronics have introduced an expansion of applications such as advanced driver assistance, safety features, infotainment services, etc. An increased capability and number of in-vehicle CPUs 102 and increased number of components may be provided to support the expanded features. For example, the components provided to support the expanded features may include associated distributed networks of sensors, video streaming units, radars, etc. The interconnections between the in-vehicle CPUs 102 and components within the vehicle may impose extensive and complex wiring infrastructures. The complex wiring infrastructure may increase the design complexity, manufacturing cost, or production steps. In one example, a wiring harness of a complex wiring infrastructures to interconnect components may weigh as much as 60 kg.

In some aspects, the in-vehicle network 100 may include wireless in-vehicle networks that may provide wireless connections of various components/devices on the vehicle. The wireless in-vehicle networks may replace or reduce the wires in the harness. The wireless in-vehicle networks may have various advantages, including reduced manufacturing cost, improved fuel efficiency, and increased design flexibility. Certain progress has been made in the field of wireless in-vehicle network research, and further research may address the advanced vehicle application.

In some aspects, the in-vehicle CPU 102 may include an infotainment system, which may provide a large range of infotainment and multimedia services in vehicles for the driver and passengers, such as road-surveillance videos from multiple cameras mounted on the vehicle, video shots highlighting the traffic conditions on the roads and highways on the planned route, entertainment-multimedia applications for in-seat passengers, etc. In some aspects, the in-vehicle CPU 102 may include the FADEC and receive information from the plurality of devices 104, 106, 108, 110, 112, 114, and 116. In some aspects, the plurality of devices 104, 106, 108, 110, 112, 114, and 116 may be remote sensors configured to generate and transmit the video streams to the in-vehicle CPU 102, and the in-vehicle CPU 102 may receive the video streams from the plurality of devices 104, 106, 108, 110, 112, 114, and 116. The in-vehicle CPU 102 may analyze the video streams received from the plurality of devices 104, 106, 108, 110, 112, 114, and 116, and provide various controls for the vehicle. For example, the in-vehicle CPU 102 may provide, based on received video streams, various services such as autonomous driving, active or passive lane-keeping assist, collision warning/prevention, smart/adaptive cruise control, etc.

According to increased number and bandwidth of cameras/video streaming devices and the limited physical resources of the in-vehicle network 100 including the wireless in-vehicle networks for the transmission of the video streams, i.e., frequency-time resources, the video streams may be compressed before being transmitted to the in-vehicle CPU 102. That is, the video streams may be compressed to accommodate the bandwidth of the wireless in-vehicle communication. For example, an uncompressing frame of a video stream of 1280×960 pixels with 24 bits per pixel may have a bandwidth of (Frame_Height)×(Frame_Width)×(Bits_Per_Pixel)=1280×960×24=29.49 megabits (Mb), and with the video stream at 30 frames per second (fps), the wireless in-vehicle may need to have 1280×960×30×24=884.74 megabits per second (Mbps) of network data transmission speed to support that one video stream alone. In some aspects, the frames of video streams may be compressed to accommodate the network bandwidth and the network data transmission speed. In some aspects, a resource allocation scheme may be provided to be adapted for compressed video streams, which may provide a more efficient distribution of resources and reduce the latency in the wireless in-vehicle communication.

In some aspects, the wireless in-vehicle communication may suffer interferences 144 from external environment. That is, the vehicle may receive wireless signals from an external environment that may interfere with the wireless in-vehicle network between the in-vehicle CPU 102, the plurality of devices 104, 106, 108, 110, 112, 114, and 116, the component 120, or the communication module 130. In some aspects, a resource allocation scheme may be provided to reduce the effect of the interferences 144 received from the external environment to improve a quality of service and reduce the latency in the wireless in-vehicle communication.

Figure 2:
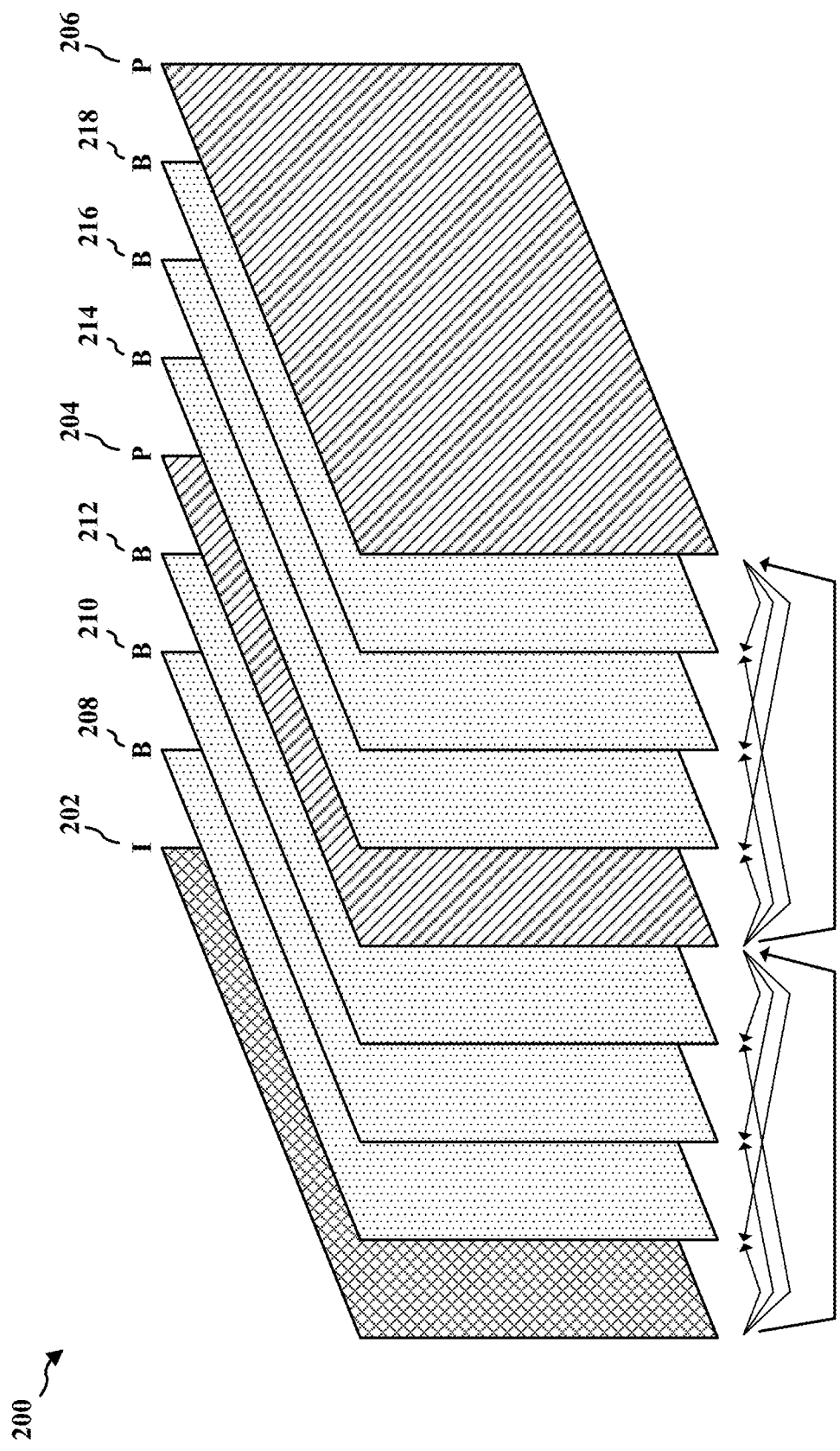
FIG. 2 illustrates an example of compressed video frames.

FIG. 2 illustrates an example 200 of compressed video frames. The example 200 of the compressed video frames may include one (1) I-frame 202, two (2) P-frames 204 and 206, and/or six (6) B-frames 208, 210, 212, 214, 216, and 218.

In some aspects, video frames may be compressed using different algorithms. The algorithms for compressing video frames of the video streams may be based on the amount of data compression. The video compression may include different types of video frames generated by different compression algorithms. In some aspects, the frame types according to the different video compression algorithms may include three major frame types: I-frame, P-frame, and B-frame. The P-frame and the B-frame may collectively be referred to as delta-frames.

The I-frame may be independently compressed video frames. The I-frame may be the least compressible frame and may not refer to other video frames to decode the I-frame. That is, the I-frame may be a complete image, analogous to a Joint Photographic Group (JPG) image file or a bitmap (BMP) image file. Example 200 illustrates that the I-frame 202 may be independently compressed and/or decompressed with no reference to other video frames. The I-frame, P-frame, and/or B-frame may be compressed and/or decompressed using any applicable form of video compression technics, e.g., moving picture experts group (MPEG) family, H.264, H.265, etc.

The P-frame may be compressed and/or decompressed using the data from at least one previous/preceding frame. That is, the P-frames may include a change in the image data with reference to the at least one previous frame. The previous frame may include an I-frame or a preceding P-frame. That is, the P-frame may refer to at least one preceding I-frame or P-frame to compress and/or decompress the P-frame. The P-frame may be more compressible than the I-frame. For example, in a video stream of a car moving across a stationary background, the car's movements may need to be encoded. The encoder may not need to store the unchanging background pixels in the P-frame, thus reserving the bandwidth and/or resources to communicate the P-frame. Example 200 illustrates that the first P-frame 204 may be compressed and/or decompressed by referring to the I-frame 202 preceding the first P-frame 204, and the second P-frame 206 may be compressed and/or decompressed by referring to the first P-frame 204 preceding the second P-frame 206.

The B-frame may refer to both at least one previous/preceding frame and at least one forward/subsequent frame for data reference to get the highest amount of data compression. That is, the B-frame may refer to the preceding and subsequent frames to compress and/or decompress the B-frame. Example 200 illustrates that the first B-frame 208, the second B-frame 210, and the third B-frame 212 may be compressed and/or decompressed using the data from the I-frame 202 and the first P-frame 204. Also, the fourth B-frame 214, the fifth B-frame 216, and the sixth B-frame 218 may be compressed and/or decompressed using the data from the first P-frame 204 and the second P-frame 206.

In some aspects, each video stream may include a group of compressed video frames, including I-frames, the P-frames, and the B frames, in a pattern. The pattern of the compressed video frames may be maintained throughout the transmission of each video stream. That is, the pattern of the I-frames, the P-frames, and the B frames of the video streaming may remain the same within the transmission for each video stream. For example, the example 200 of the compressed video frames may have a frame pattern of IBBPBBI throughout the video stream.

Figure 3:
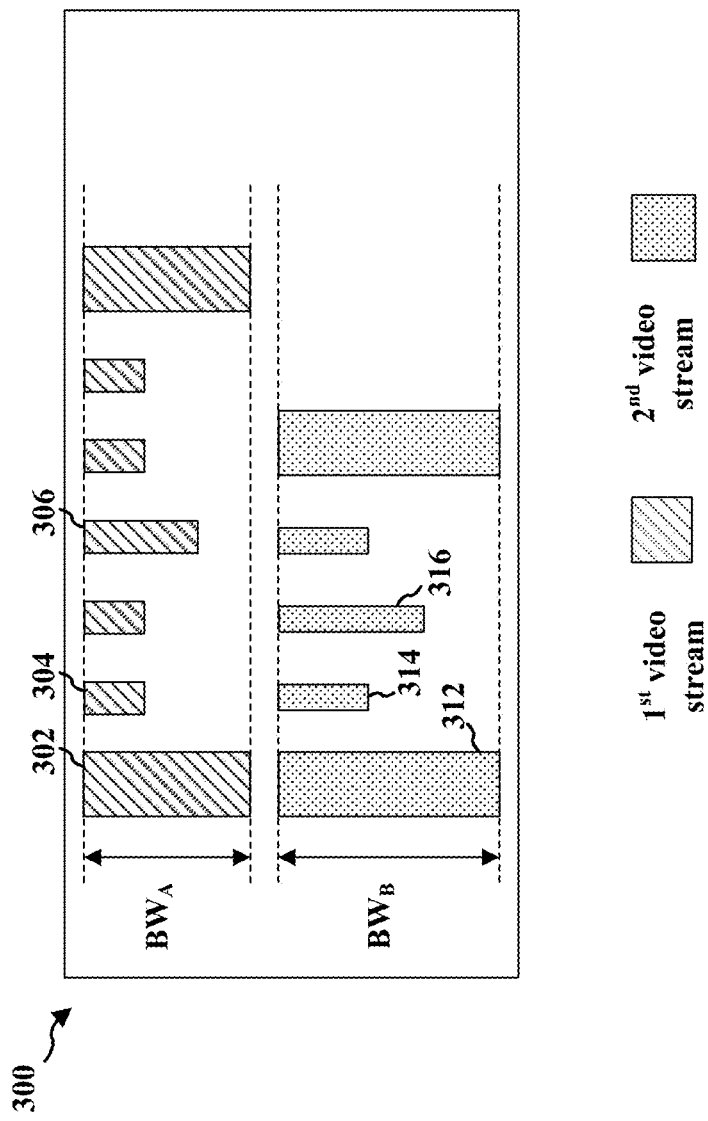
FIG. 3 illustrates examples of time-frequency resource allocations for transmission of video streams.
Figure 4:
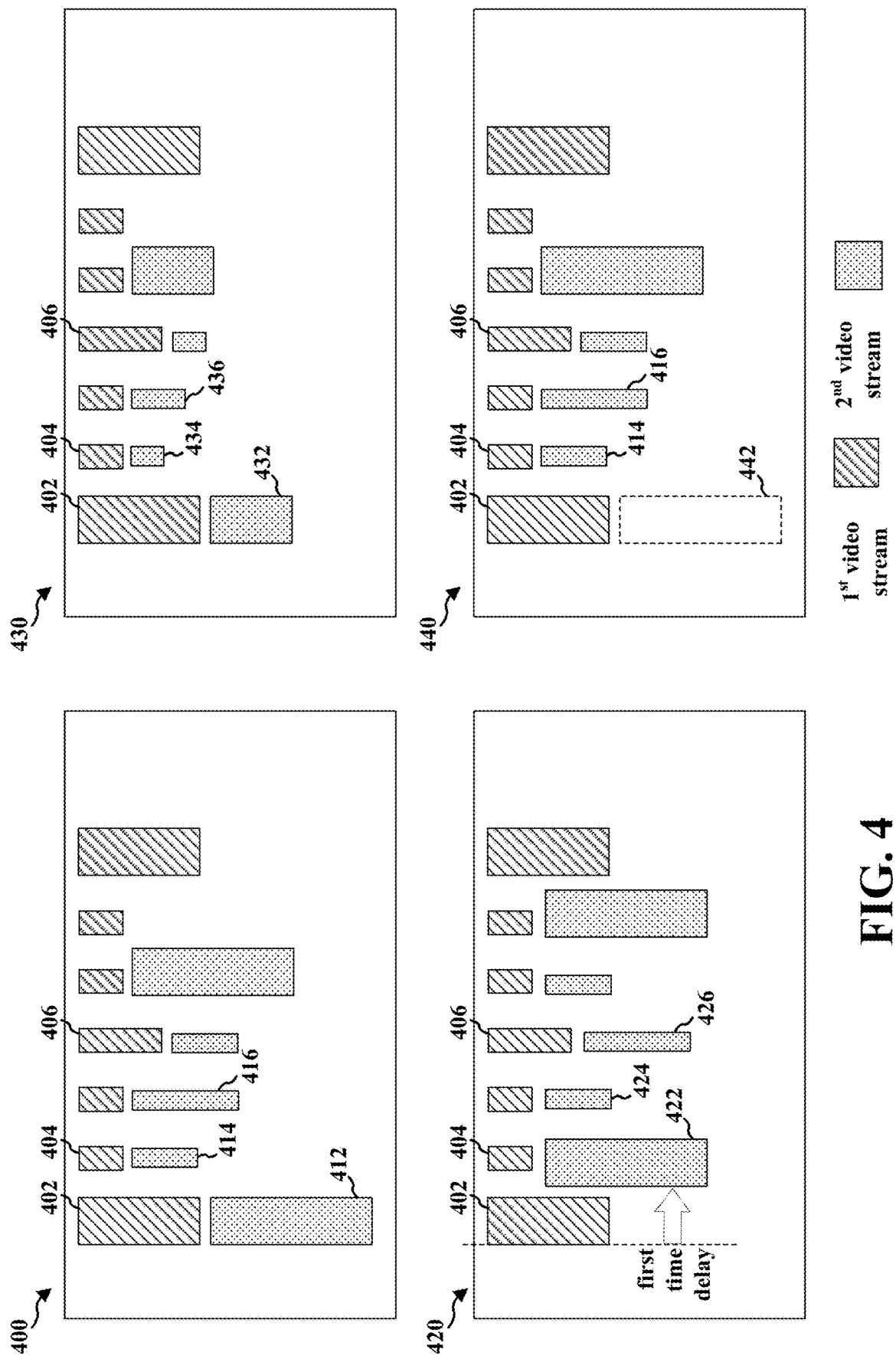
FIG. 4 illustrates examples of time-frequency resource allocations for transmission of video streams.

FIGS. 3 and 4 illustrate examples of time-frequency resource allocations for transmission of the video streams. Referring to FIGS. 3 and 4, a first video stream or a second video stream may be due for transmission. A scheduling unit may schedule the resource allocations for transmission of the first video stream or the second video stream from one or more video sources. That is, the scheduling unit may schedule the resource allocations for the one or more video sources to transmit the first video stream or the second video stream. In one aspect, the scheduling unit may be an in-vehicle CPU. In another aspect, the scheduling unit may be configured to schedule the resource allocations to receive the first video stream or the second video stream and communicate the received first video stream or the second video stream to the in-vehicle CPU.

FIG. 3 illustrates bandwidths 300 of the first video stream and the second video stream. The first video stream and the second video stream may have different patterns of compressed frame and different maximum sizes configured for each compressed frame type. The first video stream may have a first compressed frame pattern of IBBPBBI. That is, the first video stream may have the first compressed frame pattern of IBBPBBI including a first I-frame 302, a first B-frame 304, and a first P-frame 306. In one aspect, the first I-frame 302 may have a maximum size of 400 kilobytes (kB), the first P-frame 306 may have a maximum size of 300 kB, and the first B-frame 304 may have a maximum size of 100 kB. In one aspect, the first video stream may have a first bandwidth BWA corresponding to the maximum size of the first I-frame 302 of the first video stream. For example, the first bandwidth BWA may correspond to the maximum size of 400 kB configured for the first I-frame 302.

The second video stream may have a second compressed frame pattern of IBPBI. That is, the second video stream may have the second compressed frame pattern of IBPBI including a second I-frame 312, a second B-frame 314, and a second P-frame 316. In one aspect, the second I-frame 312 may have a maximum size of 900 kB, the second P-frame 316 may have a maximum size of 400 kB, and the second B-frame 314 may have a maximum size of 200 kB. In one aspect, the second video stream may have a second bandwidth BWB corresponding to the maximum size of the second I-frame 312 of the second video stream. For example, the second bandwidth BWB may correspond to the maximum size of 900 kB configured for the second I-frame 312.

Both the first video stream and the second video stream may have a frame rate of 30 fps. In some aspects, the in-vehicle scheduling unit may know at least one of the compressed frame pattern and the maximum size of each compressed frame of the first video stream and the second video stream in advance. The scheduling unit may allocate the time-frequency resources based on the at least one of the compressed frame pattern and the maximum size of each compressed frame of the video streams of different video sources depending on the compressed frame type of the video frame to be transmitted at a given time slot.

In some aspects, the in-vehicle scheduling unit at a given time slot may allocate the time-frequency resources based on the types of the compressed frames that is due for transmission from the video sources. Accordingly, the in-vehicle scheduling unit may provide an improved support for an increased number of video sources. Also, the scheduling unit may schedule the first video source and the second video source such that the I-frames of different video sources may be scheduled on different time slots. The scheduling unit may have a better time-frequency resource management across the time slots. Therefore, the scheduling unit may schedule the transmission of the video streams over the in-vehicle wireless network based on the frame structures of the streaming source to increase the overall spectral efficiency and reduce the overall streaming delay or latency.

FIG. 4 illustrates examples 400, 420, 430, and 440 of time-frequency resource allocations for transmission of the first video stream and the second video stream. In some aspects, the scheduling unit may control the resource allocations for a plurality of components (e.g., the plurality of devices 104, 106, 108, 110, 112, 114, and 116) of the network by considering the compressed frame types including the I-frames, the B-frames, and the P-frames when scheduling the time-frequency resources for the transmission of the video streams of the video sources. That is, the scheduling unit may schedule the time-frequency resource allocations for transmitting each video frame of the video streams based on the compressed frame type of the video frame. As such, the time-frequency resources to support the maximum number of bits specified for the I-frame, the P-frame, and the B-frame frame may be different due to the different nature of the compressed frames.

In some aspects, a first video frame of a first video stream and a second video frame of a second video stream having the same compressed frame type may be concurrently due for transmission at the same time slot. Referring to example 400, the first I-frame 402 of the first video stream and the second I-frame 412 of the second video stream may be concurrently due for transmission at the same time slot. The scheduling unit may determine that the first I-frame 402 of the first video stream and the second I-frame 412 of the second video stream are concurrently due for transmission at the same time slot, and the scheduling unit may compare priorities of the first video stream and the second video stream to schedule the first I-frame 402 and/or the second I-frame 412 at a first time slot. That is, upon determining that the first video stream has a higher priority than the second video stream, the scheduling unit may schedule the time-frequency resource allocations for the first I-frame 402 at the first time slot. In some aspects, the first time slot may be the same time slot that the first I-frame 402 and the second I-frame 412 are concurrently due for transmission. That is, the scheduling unit may determine that the first video stream has a higher priority than the second video stream, and may schedule the first I-frame 402 at the first time slot without any additional time delay from the time slot that the first I-frame 402 and the second I-frame 412 are concurrently due for transmission originally.

In some aspects, the first time slot may not be the same time slot that the first I-frame 402 and the second I-frame 412 are concurrently due for transmission. In one aspect, the first time slot may be scheduled with an additional time delay from the time slot that the first I-frame 402 and the second I-frame 412 are concurrently due for transmission originally. In some aspects, the scheduler may determine the first time slot, at which the resource allocations are scheduled for the first I-frame 402 of the first video stream that is determined to have the higher priority, based on the condition of the wireless network.

In one aspect, the scheduler may consider interferences (e.g., interferences 144) from external environment/wireless devices. The scheduler may detect the interferences from the external environment and schedule the resource allocations for the first I-frame 402 of the first video stream that has the higher priority at the first time slot that is expected to have a minimal or reduced effect from the external interferences. In another aspect, the scheduler may receive, from external environment/wireless devices (e.g., another UE and/or vehicle 142), scheduling information of wireless communication of the external environment/wireless devices that may cause adverse effects (e.g., interferences). The scheduler may consider the scheduling information of wireless communication of the external environment/wireless devices and schedule the resource allocations for the first I-frame 402 of the first video stream that has the higher priority at the first time slot that is expected to have a minimal or reduced effect from the wireless communication of the external environment/wireless devices.

In some aspects, the scheduling unit may determine that the first video frame of a first video stream and the second video frame of a second video stream having the same compressed frame type are concurrently due for transmission at the same time slot, and schedule the first frame and the second frame at different time slots. That is, the scheduling unit may determine that the first video frame of a first video stream and the second video frame of a second video stream having the same compressed frame type are concurrently due for transmission at the same time slot, and the scheduling unit may schedule the first frame of the first video stream at a first time slot and the second frame of the second video stream at a second time slot. Referring to example 420, the time-frequency resources scheduled for transmitting the second video stream, including the second I-frame 422, the second B-frame 424, and the second P-frame 426, may be configured to start at the second time slot with a first time delay from the first time slot. The first time delay may be configured so that the first I-frame 402 and the second I-frame 412 do not overlap with each other in the time domain. Accordingly, the first I-frame 402 and the second I-frame 422 may be scheduled at different time slots to improve the overall spectral efficiency and reduce the overall streaming latency.

In some aspects, the scheduling unit may determine that the first I-frame 402 of the first video stream and the second I-frame 412 of the second video stream are concurrently due for transmission at the same time slot, compare priorities of the first video stream and the second video stream, and instruct one of the first video source or the second video source to increase the video compression rate of the respective video stream that has the lower priority. That is, the scheduling unit may determine that the first video stream has a higher priority than the second video stream, and the scheduling unit may schedule the time-frequency resource allocations for both the first video stream and the second video stream at the first time slot, and instruct the second video source to increase the video compression rate of the second video stream. Referring to example 430, the time-frequency resource allocations for transmitting the second video stream having an increased video compression rate, including a second I-frame 432, a second B-frame 434, and a second P-frame 436, may be configured to start at the first time slot. Accordingly, the maximum size of the second I-frame 422 may be reduced to improve the overall spectral efficiency and reduce the overall streaming latency.

In some aspects, the scheduling unit may determine that the first I-frame 402 of the first video stream and the second I-frame 422 of the second video stream are concurrently due for transmission at the same time slot, and the scheduling unit may compare priorities of the first video stream and the second video stream to determine which one of the first I-frame 402 or the second I-frame 422 to be scheduled at the first time slot and cancel the other video stream. Referring to example 440, the scheduling unit may determine that the first I-frame 402 of the first video stream and the second I-frame 442 of the second video stream are concurrently due for transmission at the same time slot. The scheduling unit may determine that the first video stream has a higher priority than the second video stream, schedule the time-frequency resource allocations for the first I-frame 402 of the first video stream at the first time slot, and cancel the transmission of the second I-frame 442 of the second video stream. The resource allocations for the remaining video frames of the second video stream including the second B-frame 414 and the second P-frame 416 may be scheduled. Accordingly, the overall spectral efficiency may be improved.

In some aspects, priorities of the first video stream and the second video stream may be determined based on one or more of a relative position of a vehicle; an operation of the vehicle including at least one of direction, velocity, or acceleration; an external environment of the vehicle including interference from other wireless devices; a location of the video source; a direction of reception of the video source relative to the vehicle; or a resolution of the video source.

In one aspect, the priority of the video stream may be determined based at least on the position of a vehicle. The position of the vehicle may include the geographical position of the vehicle, e.g., the GPS coordinates of the vehicle or the bearing of the vehicle, a time of the day that the vehicle is in operation, the lane position of the vehicle on the road, etc. For example, when the vehicle is positioned on the left lane of the road, the video stream of the video source disposed on the left side of the vehicle (e.g., 106 and/or 108 as illustrated in FIG. 1) may have a lower priority that the video stream of the video source disposed on the right side of the vehicle (e.g., 110 and/or 112 as illustrated in FIG. 1).

In one aspect, the priority of the video stream may be determined based at least on the operation of the vehicle. The operation of the vehicle may include the direction, the velocity, or the acceleration of the vehicle. In some aspects, the vehicle may be driving the vehicle in a lane, changing lanes on the road, making a turn left or right, driving the vehicle in reverse, parking the vehicle, etc. For example, when the vehicle is driving in a lane, the video stream of the front-facing camera (e.g., 104, as illustrated in FIG. 1) may have a high priority. When the vehicle is changing the lanes on the road or making a turn, the video stream of the camera facing the respective sides of the lane change or the turn may have a higher priority than the other cameras. When parking the vehicle, the video stream of the rear-facing camera (e.g., 114 as illustrated in FIG. 1) and/or a 360-degree camera (e.g., 116 as illustrated in FIG. 1) may have a higher priority than the other cameras.

In some aspects, the priority of the video stream may be determined based at least on the external environment of the vehicle. The external environment of the vehicle may include a volume of traffic, ambient lighting, interference from other wireless devices, etc. For example, when there is a heavier volume of traffic on the right side of the vehicle, the video streams of the video sources disposed on the right side of the vehicle (e.g., 110 and/or 112 as illustrated in FIG. 1) may have a higher priority than the video sources disposed on the left side of the vehicle (e.g., 106 and/or 108 as illustrated in FIG. 1). In one aspect, the scheduler may receive, from the external wireless devices (e.g., another UE and/or vehicle 142), the operation information of the external wireless devices relative to the vehicle including the scheduling unit, and determine the priority of the video stream based on the received operation information of the external devices. For example, the scheduler may receive, from another vehicle that it is operating to pass the vehicle that includes the scheduler from the left lane, and the scheduler may determine that the video stream of the video source disposed on the left side of the vehicle facing the rear of the vehicle (e.g., 108) may have a higher priority than the other video sources.

In one aspect, the priority of the video stream may be determined based on at least one of the locations of the video source, the direction of reception of the video source relative to the vehicle, or the resolution of the video source. For example, the video stream from the front-facing camera (e.g., 104, as illustrated in FIG. 1) may have a higher priority than the video stream from the 360-degree camera (e.g., 116 as illustrated in FIG. 1). For example, the first video stream from the first video source having a higher resolution may have a higher priority than the second video stream from the second video source having a lower resolution.

FIG. 4 illustrates that the first I-frame 402 and the second I-frame 412 are due for transmission at the same time slot, but the aspects of the present disclosure are not limited thereto. For example, the scheduling unit may apply the aspects illustrated in FIG. 4 to a case that the first B-frame 404 and the second B-frame 414 are due for transmission at the same time slot and/or a case that the first P-frame 406 and the second P-frame 416 are due for transmission at the same time slot.

Figure 5:
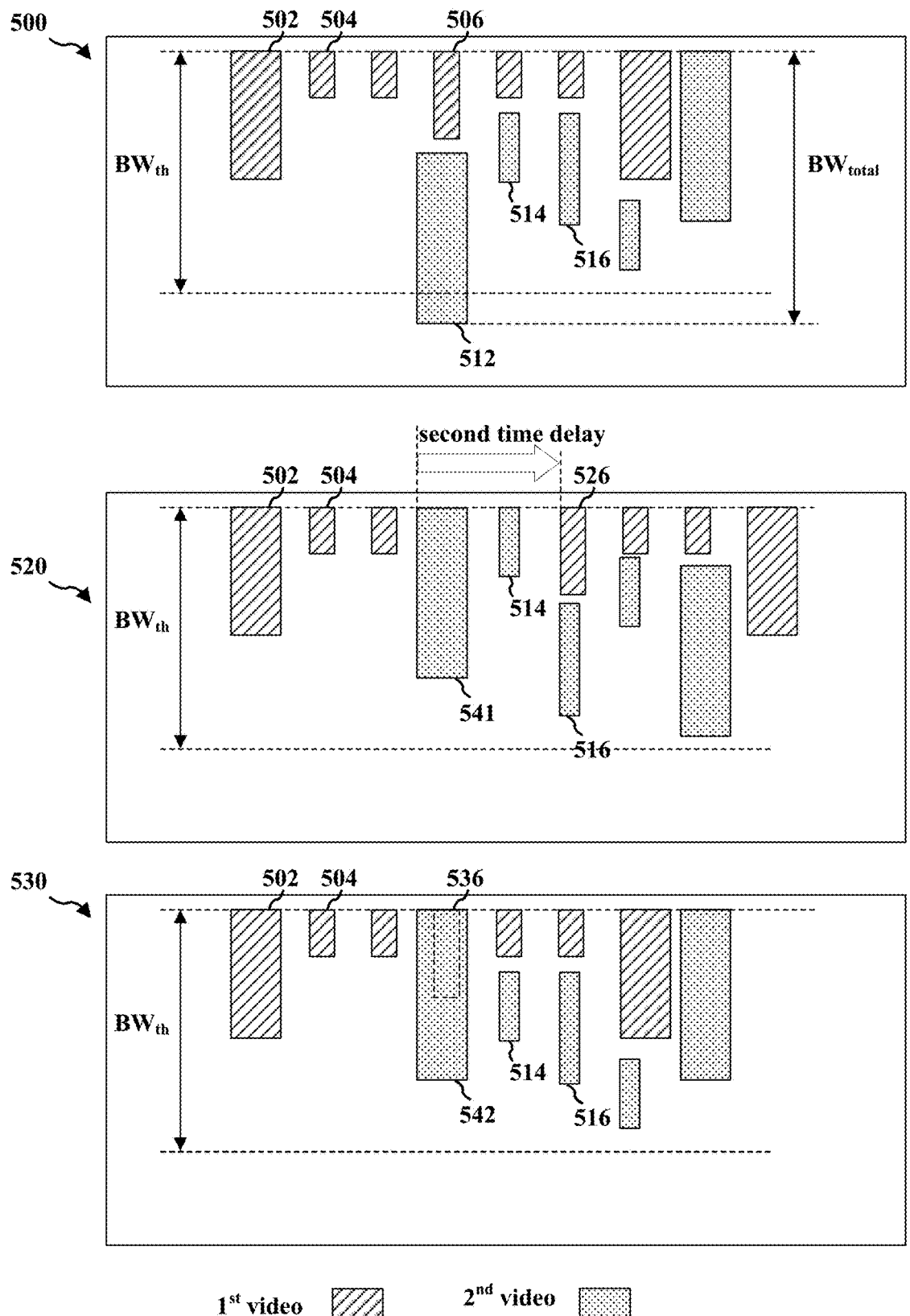
FIG. 5 illustrates examples of time-frequency resource allocations for transmission of video streams.

FIG. 5 illustrates examples 500, 520, and 530 of time-frequency resource allocations for transmission of the first video stream and the second video stream. In scenarios where multiple video sources may be concurrently transmitting video streams, the scheduling unit may ensure that the combination of the I-frame, the B-frame, and the P-frame scheduled in a time slot may be scheduled such that an overall QoS may be increased or improved. That is, the scheduling unit at a given time slot may allocate the time-frequency resources based on the compressed frame types and/or an overall frequency bandwidth of the compressed frames that are concurrently due for transmission by the respective video sources.

Referring to example 500, the first video stream may include a first I-frame 502, a first B-frame 504, and a first P-frame 506, and the second video stream may include a second I-frame 512, a second B-frame 514, and a second P-frame 516. The first P-frame 506 and the second I-frame 512 may be concurrently due for transmission at the same time slot. The total frequency bandwidth $BW_{total}$ of the scheduled time-frequency resource allocations for the first P-frame 506 and the second I-frame 512 due for transmission may be greater than a threshold bandwidth $BW_{th}$. The scheduling unit may determine that the total frequency bandwidth $BW_{total}$ of the scheduled time-frequency resource allocations for the first P-frame 506 and the second I-frame 512 at the same time slot is greater than or equal to the threshold bandwidth $BW_{th}$. Upon determining that the total frequency bandwidth $BW_{total}$ of the scheduled time-frequency resource allocations for the first P-frame 506 and the second I-frame 512 at the same time slot is greater than or equal to the threshold bandwidth $BW_{th}$, the scheduling unit may schedule the time-frequency resource allocations the second I-frame 512 based on the compressed frame type.

In some aspects, the first time slot may be the same time slot that the first P-frame 506 and the second I-frame 512 are concurrently due for transmission. That is, the scheduling unit may determine that the second I-frame 512 has the higher frame priority than the first P-frame 506, and may schedule the second I-frame 512 at the first time slot without any additional time delay from the time slot that the first P-frame 506 and the second I-frame 512 are concurrently due for transmission originally.

In some aspects, the first time slot may not be the same time slot that the first P-frame 506 and the second I-frame 512 are concurrently due for transmission. In one aspect, the first time slot may be scheduled with an additional time delay from the time slot that the first P-frame 506 and the second I-frame 512 are concurrently due for transmission originally. In some aspects, the scheduler may determine the first time slot, at which the resource allocations are scheduled for the second I-frame 512 that has the higher frame priority than the first P-frame 506, based on the condition of the wireless network.

In one aspect, the scheduler may consider interferences (e.g., interferences 144) from external environment/wireless devices. The scheduler may detect the interferences from the external environment and schedule the resource allocations for the first P-frame 506 of the first video stream that has the higher priority at the first time slot that is expected to have a minimal or reduced effect from the external interferences. In another aspect, the scheduler may receive, from external environment/wireless devices (e.g., another UE and/or vehicle 142), scheduling information of wireless communication of the external environment/wireless devices that may cause adverse effects (e.g., interferences). The scheduler may consider the scheduling information of wireless communication of the external environment/wireless devices and schedule the resource allocations for the second I-frame 512 at the first time slot that is expected to have a minimal or reduced effect from the wireless communication of the external environment/wireless devices.

In some aspects, upon determining that the total frequency bandwidth $BW_{total}$ of the scheduled time-frequency resource allocations for a first compressed frame of a first video stream and a second compressed frame of a second video stream at the time frame is greater than or equal to the threshold bandwidth $BW_{th}$, the scheduling unit may schedule the time-frequency resource allocations for the second compressed frame at a first time slot, and schedule the time-frequency resource allocations for the first compressed frame at a second time slot delayed from the first time slot with a time delay. In one aspect, the second compressed frame may be the I-frame, and the first compressed frame may be the delta frame. In another aspect, the second compressed frame may be the P-frame, and the first compressed frame may be the B-frame. Referring to example 520, upon determining that the total frequency bandwidth $BW_{total}$ of the scheduled time-frequency resource allocations for the first P-frame 506 and the second I-frame 512 at the same time slot is greater than or equal to a threshold bandwidth $BW_{th}$, the scheduling unit may schedule the time-frequency resource allocations for the second I-frame 541 at the first time slot and schedule the time-frequency resource allocations for the first P-frame 526 at the second time slot delayed from the first time slot with the second time delay. The first P-frame 526 and the second I-frame 541 may be scheduled at different time slots, so the overall frequency bandwidth of the scheduled time-frequency resource allocations is not greater than or equal to the threshold bandwidth $BW_{th}$. Accordingly, the overall spectral efficiency may be improved, and the overall streaming latency may be reduced.

In some aspects, the scheduling unit may, upon determining that the total frequency bandwidth $BW_{total}$ of the scheduled time-frequency resource allocations for the first compressed frame of a first video stream and the second compressed frame of a second video stream at the time frame is greater than or equal to a threshold bandwidth $BW_{th}$, determine which one of the first video stream or the second video stream to be scheduled at the first time slot and cancel the other video stream. In one aspect, the scheduling unit may, upon determining that the total frequency bandwidth $BW_{total}$ of the scheduled time-frequency resource allocations for the first P-frame 506 and the second I-frame 542 at the time frame is greater than or equal to a threshold bandwidth $BW_{th}$, determine to cancel the first P-frame 536 of the first video stream. That is, upon determining that the first P-frame 506 of the first video stream and the second I-frame 542 of the second video stream are scheduled at the same time frame with the overall frequency bandwidth greater than or equal to the threshold bandwidth $BW_{th}$, the scheduling unit may schedule the time-frequency resource allocations for the second I-frame 502 at the first time slot and cancel the transmission of the first P-frame 536 of the first video stream. Accordingly, the overall spectral efficiency may be improved.

Figure 6:
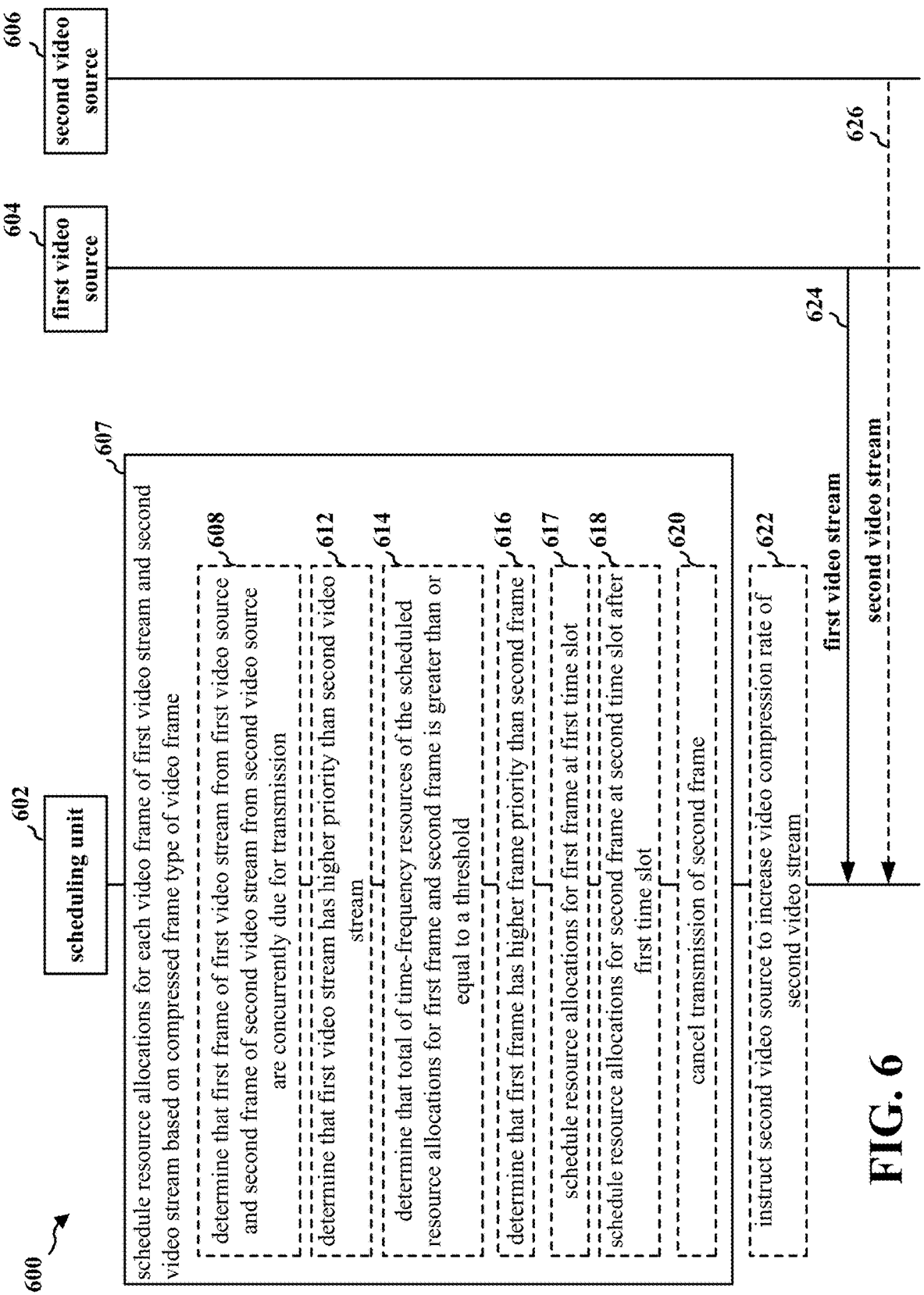
FIG. 6 illustrates a call-flow diagram of wireless communication.

FIG. 6 illustrates a call-flow diagram 600 of wireless communication. The call-flow diagram 600 may include a scheduling unit 602, a first video source 604, and a second video source 606. The scheduling unit 602 may receive a first video stream from the first video source 604, and a second video stream from the second video source 606.

At 607, the scheduling unit 602 may schedule resource allocations for each video frame of a plurality of video frames of video streams from a plurality of video sources based on a compressed frame type of the video frame, the compressed frame type being one of an I-frame, a P-frame, or a B-frame. That is, the scheduling unit 602 may schedule resource allocations for a first frame of the first video stream from the first video source 604 and a second frame of the second video stream from the second video source 606 based on the compressed frame type of the first frame and the second frame. The video streams may include the first video stream and the second video stream and the plurality of video sources may include the first video source 604 and the second video source 606. In some aspects, the resource allocations may be scheduled to minimize the maximum sum of frequency bandwidth of resource allocations concurrently scheduled for the video streams. In some aspects, the resource allocations may be scheduled to minimize a maximum sum of time-frequency resources associated with the resource allocations in each time slot of a set of time slots. The 607 may include the 608, 612, 614, 616, 617, 618, and 620.

At 608, the scheduling unit 602 may determine that the first frame of the first video stream from the first video source 604 and the second frame of the second video stream from the second video source 606 are concurrently due for transmission at a first time slot. In some aspects, scheduling unit may determine that the first frame and the second frame have the same compressed frame type. In one aspect, the compressed frame type of the first frame and the second frame may be the I-frame.

At 612, the scheduling unit 602 may determine that the first video stream has a higher priority than the second video stream. In some aspects, the scheduling unit 602 may determine the priorities of the first video stream and the second video stream based on at least one of a relative position of a vehicle; an operation of the vehicle including at least one of direction, velocity, or acceleration; an external environment of the vehicle including interference from other wireless devices; a location of the video source; a direction of reception of the video source relative to the vehicle; or a resolution of the video source, etc. In some aspects, the scheduling unit 602 may schedule the resource allocations based on the determination of the priorities of the first video stream and the second video stream.

At 614, the scheduling unit 602 may determine that a total of time-frequency resources of the scheduled resource allocations for the first frame of the first video stream from the first video source 604 and the second frame of the second video stream from the second video source 606 concurrently due for transmission is greater than or equal to a threshold value.

At 616, the scheduling unit 602 may determine that the first frame has a higher frame priority than the second frame based on the determination that the total frequency bandwidth of scheduled resource allocations for each video frame of the plurality of video frames of the video streams is greater than or equal to the threshold bandwidth at 614. That is, the scheduling unit 602 may determine that that the I-frame has a higher frame priority than the P-frame or the B-frame, and that the P-frame has a higher frame priority than the B-frame. In one aspect, the first frame with a compressed frame type of the I-frame may be determined to have a higher frame priority than the second frame with a compressed frame type of the P-frame or the B-frame. In another aspect, the first frame with a compressed frame type of the P-frame may be determined to have a higher frame priority than the second frame with a compressed frame type of the B-frame.

At 617, the scheduling unit 602 may schedule the resource allocations for the first frame of the first video stream at the first time slot. In one aspect, the scheduling unit 602 may schedule the resource allocations for the first frame of the first video stream at the first time slot based on the determination that the first video stream has a higher priority at 612. In another aspect, scheduling unit 602 may schedule the resource allocations for the first frame of the first video stream at the first time slot based on the determination that the first frame has a higher frame priority than the second frame at 616.

In some aspects, the first time slot may be the same time slot that the first frame and the second frame are concurrently due for transmission. That is, the scheduling unit may schedule the first frame at the first time slot without any additional time delay from the time slot that the first frame and the second frame are concurrently due for transmission originally. In some aspects, the first time slot may not be the same time slot that the first frame and the second frame are concurrently due for transmission. In one aspect, the first time slot may be scheduled with an additional time delay from the time slot that the first frame and the second frame are concurrently due for transmission originally. In some aspects, the scheduling unit 602 may determine the first time slot, at which the resource allocations are scheduled for the first frame, based on the condition of the wireless network. In one aspect, the scheduling unit 602 may consider interferences (e.g., interferences 144) from external environment/wireless devices. The scheduling unit 602 may detect the interferences from the external environment and schedule the resource allocations for the first frame that is expected to have a minimal or reduced effect from the external interferences. In another aspect, the scheduling unit 602 may receive, from external environment/wireless devices (e.g., another UE and/or vehicle 142), scheduling information of wireless communication of the external environment/wireless devices that may cause adverse effects (e.g., interferences), and schedule the resource allocations for the first frame at the first time slot that is expected to have a minimal or reduced effect from the wireless communication of the external environment/wireless devices.

At 618, the scheduling unit 602 may schedule the resource allocations for the second frame of the second video stream at a second time slot after the first time slot based on the determination at 612 and/or 616. That is, the scheduling unit 602 may schedule the resource allocations for the second frame of the second video stream at a second time slot after the first time slot. In one aspect, the resource allocations for the second frame of the second video stream may be scheduled at a second time slot after the first time slot based on the determination that the first video stream has a higher priority than the second video stream at 612. In another aspect, the resource allocations for the second frame of the second video stream may be scheduled at a second time slot after the first time slot based on the determination that the first frame has a higher frame priority than the second frame at 616.

At 620, the scheduling unit 602 may cancel the transmission of the second frame of the second video stream based on the determination at 612 and/or 616. In one aspect, the transmission of the second frame of the second video stream may be canceled based on the determination that the first video stream has a higher priority than the second video stream at 612. In another aspect, the transmission of the second frame of the second video stream may be canceled based on the determination that the first frame has a higher frame priority than the second frame at 616.

At 622, the scheduling unit 602 may instruct the second video source to increase a video compression rate of the second video stream based on the determination that the first video stream has a higher priority at 612. That is, the scheduling unit 602 may instruct the second video source 606 to increase the video compression rate of the second video stream based on the determination that the first video stream has a higher priority than the second video stream at 612.

At 624, the scheduling unit 602 may receive the video streams from the plurality of video sources based on the scheduled resource allocations. That is, the scheduling unit 602 may receive the first video stream from the first video source 604 based on the scheduled resource allocations. At 626, the scheduling unit 602 may receive the second video stream from the second video source 606 based on the scheduled resource allocations.

Figure 7:
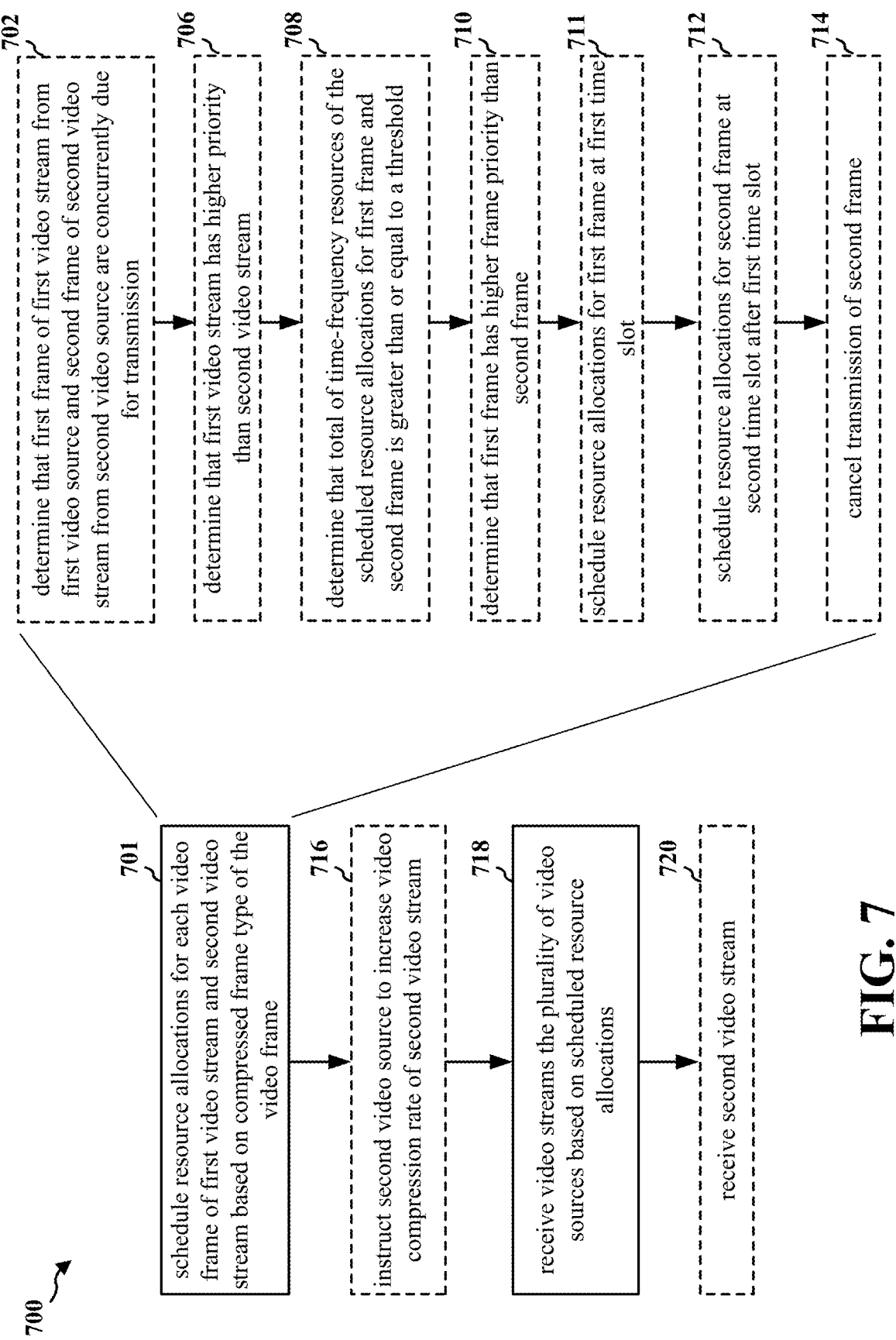
FIG. 7 is a flowchart of a method of wireless communication.

FIG. 7 is a flowchart 700 of a method of wireless communication. The method may be performed by a scheduling unit (e.g., the scheduling unit 602; the apparatus 902).

At 701, the scheduling unit may schedule resource allocations for each video frame of a plurality of video frames of video streams from a plurality of video sources based on a compressed frame type of the video frame, the compressed frame type being one of an I-frame, a P-frame, or a B-frame. That is, the scheduling unit may schedule resource allocations for a first frame of the first video stream from the first video source and a second frame of the second video stream from the second video source based on the compressed frame type of the first frame and the second frame. The video streams may include the first video stream and the second video stream and the plurality of video sources may include the first video source and the second video source. In some aspects, the resource allocations may be scheduled to minimize the maximum sum of frequency bandwidth of resource allocations concurrently scheduled for the video streams. In some aspects, the resource allocations may be scheduled to minimize a maximum sum of time-frequency resources associated with the resource allocations in each time slot of a set of time slots. The 701 may include the 702, 706, 708, 710, 711, 712, and 714. For example, at 607, the scheduling unit 602 may schedule resource allocations for each video unit of a plurality of video frames of video streams from a plurality of video sources based on a compressed frame type of the video frame, the compressed frame type being one of an I-frame, a P-frame, or a B-frame. Furthermore, 701 may be performed by a video frame scheduling component 940.

At 702, the scheduling unit may determine that the first frame of the first video stream from the first video source and the second frame of the second video stream from the second video source are concurrently due for transmission at a first time slot. In some aspects, scheduling unit may determine that the first frame and the second frame have the same compressed frame type. In one aspect, the compressed frame type of the first frame and the second frame may be the I-frame. For example, at 608, the scheduling unit 602 may determine that the first frame of the first video stream from the first video source 604 and the second frame of the second video stream from the second video source 606 are concurrently due for transmission at a first time slot. Furthermore, 702 may be performed by the video frame scheduling component 940.

At 706, the scheduling unit may determine that the first video stream has a higher priority than the second video stream. In some aspects, the scheduling unit may determine the priorities of the first video stream and the second video stream based on at least one of a relative position of a vehicle; an operation of the vehicle including at least one of direction, velocity, or acceleration; an external environment of the vehicle including interference from other wireless devices; a location of the video source; a direction of reception of the video source relative to the vehicle; or a resolution of the video source, etc. In some aspects, the scheduling unit may schedule the resource allocations based on the determination of the priorities of the first video stream and the second video stream. For example, at 612, the scheduling unit 602 may determine that the first video stream has a higher priority than the second video stream. Furthermore, 706 may be performed by the video frame scheduling component 940.

At 708, the scheduling unit may determine that a total of time-frequency resources of the scheduled resource allocations for the first frame of the first video stream from the first video source and the second frame of the second video stream from the second video source concurrently due for transmission is greater than or equal to a threshold value. For example, at 614, the scheduling unit 602 may determine that a total of time-frequency resources of the scheduled resource allocations for the first frame of the first video stream from the first video source 604 and the second frame of the second video stream from the second video source 606 concurrently due for transmission is greater than or equal to a threshold value. Furthermore, 708 may be performed by the video frame scheduling component 940.

At 710, the scheduling unit may determine that the first frame has a higher frame priority than the second frame based on the determination that the total frequency bandwidth of scheduled resource allocations for each video frame of the plurality of video frames of the video streams is greater than or equal to the threshold bandwidth at 708. That is, the scheduling unit may determine that that the I-frame has a higher frame priority than the P-frame or the B-frame, and that the P-frame has a higher frame priority than the B-frame. In one aspect, the first frame with a compressed frame type of the I-frame may be determined to have a higher frame priority than the second frame with a compressed frame type of the P-frame or the B-frame. In another aspect, the first frame with a compressed frame type of the P-frame may be determined to have a higher frame priority than the second frame with a compressed frame type of the B-frame. For example, at 616, the scheduling unit 602 may determine that the first frame has a higher frame priority than the second frame based on the determination that the total frequency bandwidth of scheduled resource allocations for each video frame of the plurality of video frames of the video streams is greater than or equal to the threshold bandwidth at 614. Furthermore, 710 may be performed by the video frame scheduling component 940.

At 711, the scheduling unit may schedule the resource allocations for the first frame of the first video stream at the first time slot. In one aspect, the scheduling unit may schedule the resource allocations for the first frame of the first video stream at the first time slot based on the determination that the first video stream has a higher priority at 706. In another aspect, scheduling unit may schedule the resource allocations for the first frame of the first video stream at the first time slot based on the determination that the first frame has a higher frame priority than the second frame at 710. For example, at 617, the scheduling unit 602 may schedule the resource allocations for the first frame of the first video stream at the first time slot. Furthermore, 711 may be performed by the video frame scheduling component 940.

In some aspects, the first time slot may be the same time slot that the first frame and the second frame are concurrently due for transmission. That is, the scheduling unit may schedule the first frame at the first time slot without any additional time delay from the time slot that the first frame and the second frame are concurrently due for transmission originally. In some aspects, the first time slot may not be the same time slot that the first frame and the second frame are concurrently due for transmission. In one aspect, the first time slot may be scheduled with an additional time delay from the time slot that the first frame and the second frame are concurrently due for transmission originally. In some aspects, the scheduling unit may determine the first time slot, at which the resource allocations are scheduled for the first frame, based on the condition of the wireless network. In one aspect, the scheduling unit may consider interferences (e.g., interferences 144) from external environment/wireless devices. The scheduling unit may detect the interferences from the external environment and schedule the resource allocations for the first frame that is expected to have a minimal or reduced effect from the external interferences. In another aspect, the scheduling unit may receive, from external environment/wireless devices (e.g., another UE and/or vehicle 142), scheduling information of wireless communication of the external environment/wireless devices that may cause adverse effects (e.g., interferences), and schedule the resource allocations for the first frame at the first time slot that is expected to have a minimal or reduced effect from the wireless communication of the external environment/wireless devices.

At 712, the scheduling unit may schedule the resource allocations for the second frame of the second video stream at a second time slot after the first time slot based on the determination at 706 and/or 710. That is, the scheduling unit may schedule the resource allocations for the second frame of the second video stream at a second time slot after the first time slot. In one aspect, the resource allocations for the second frame of the second video stream may be scheduled at a second time slot after the first time slot based on the determination that the first video stream has a higher priority than the second video stream at 706. In another aspect, the resource allocations for the second frame of the second video stream may be scheduled at a second time slot after the first time slot based on the determination that the first frame has a higher frame priority than the second frame at 710. For example, at 618, the scheduling unit 602 may schedule the resource allocations for the second frame of the second video stream at a second time slot after the first time slot based on the determination at 706 and/or 710. Furthermore, 712 may be performed by the video frame scheduling component 940.

At 714, the scheduling unit may cancel the transmission of the second frame of the second video stream based on the determination at 706 and/or 710. In one aspect, the transmission of the second frame of the second video stream may be canceled based on the determination that the first video stream has a higher priority than the second video stream at 706. In another aspect, the transmission of the second frame of the second video stream may be canceled based on the determination that the first frame has a higher frame priority than the second frame at 710. For example, at 620, the scheduling unit 602 may cancel the transmission of the second frame of the second video stream based on the determination at 706 and/or 710. Furthermore, 714 may be performed by the video frame scheduling component 940.

At 716, the scheduling unit may instruct the second video source to increase a video compression rate of the second video stream based on the determination that the first video stream has a higher priority at 706. That is, the scheduling unit may instruct the second video source to increase the video compression rate of the second video stream based on the determination that the first video stream has a higher priority than the second video stream at 706. For example, at 622, the scheduling unit 602 may instruct the second video source to increase a video compression rate of the second video stream based on the determination that the first video stream has a higher priority at 706. Furthermore, 716 may be performed by the video frame scheduling component 940.

At 718, the scheduling unit may receive the video streams from the plurality of video sources based on the scheduled resource allocations. That is, the scheduling unit may receive the first video stream from the first video source based on the scheduled resource allocations. At 624, the scheduling unit 602 may receive the video streams from the plurality of video sources based on the scheduled resource allocations. At 720, the scheduling unit may receive the second video stream from the second video source based on the scheduled resource allocations. For example, at 626, the scheduling unit 602 may receive the second video stream from the second video source 606 based on the scheduled resource allocations. Furthermore, 718 and 720 may be performed by the video frame scheduling component 940.

Figure 8:
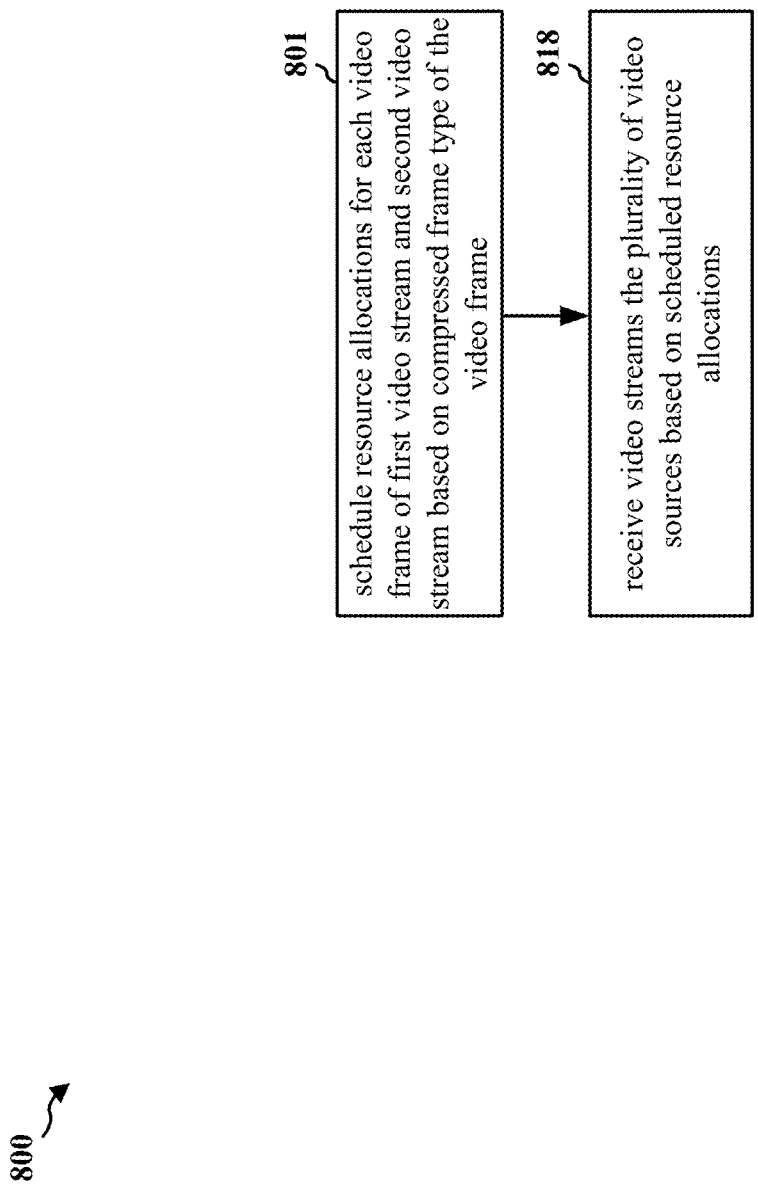
FIG. 8 is a flowchart of a method of wireless communication.

FIG. 8 is a flowchart 800 of a method of wireless communication. The method may be performed by a scheduling unit (e.g., the scheduling unit 602; the apparatus 902).

At 801, the scheduling unit may schedule resource allocations for each video frame of a plurality of video frames of video streams from a plurality of video sources based on a compressed frame type of the video frame, the compressed frame type being one of an I-frame, a P-frame, or a B-frame. That is, the scheduling unit may schedule resource allocations for a first frame of the first video stream from the first video source and a second frame of the second video stream from the second video source based on the compressed frame type of the first frame and the second frame. The video streams may include the first video stream and the second video stream and the plurality of video sources may include the first video source and the second video source. In some aspects, the resource allocations may be scheduled to minimize the maximum sum of frequency bandwidth of resource allocations concurrently scheduled for the video streams. In some aspects, the resource allocations may be scheduled to minimize a maximum sum of time-frequency resources associated with the resource allocations in each time slot of a set of time slots. The 801 may include the 802, 806, 808, 810, 811, 812, and 814. For example, at 607, the scheduling unit 602 may schedule resource allocations for each video frame of a plurality of video frames of video streams from a plurality of video sources based on a compressed frame type of the video frame, the compressed frame type being one of an I-frame, a P-frame, or a B-frame. Furthermore, 801 may be performed by a video frame scheduling component 940.

At 818, the scheduling unit may receive the video streams from the plurality of video sources based on the scheduled resource allocations. That is, the scheduling unit may receive the first video stream from the first video source based on the scheduled resource allocations. For example, at 624, the scheduling unit 602 may receive the video streams from the plurality of video sources based on the scheduled resource allocations. Furthermore, 818 may be performed by the video frame scheduling component 940.

Figure 9:
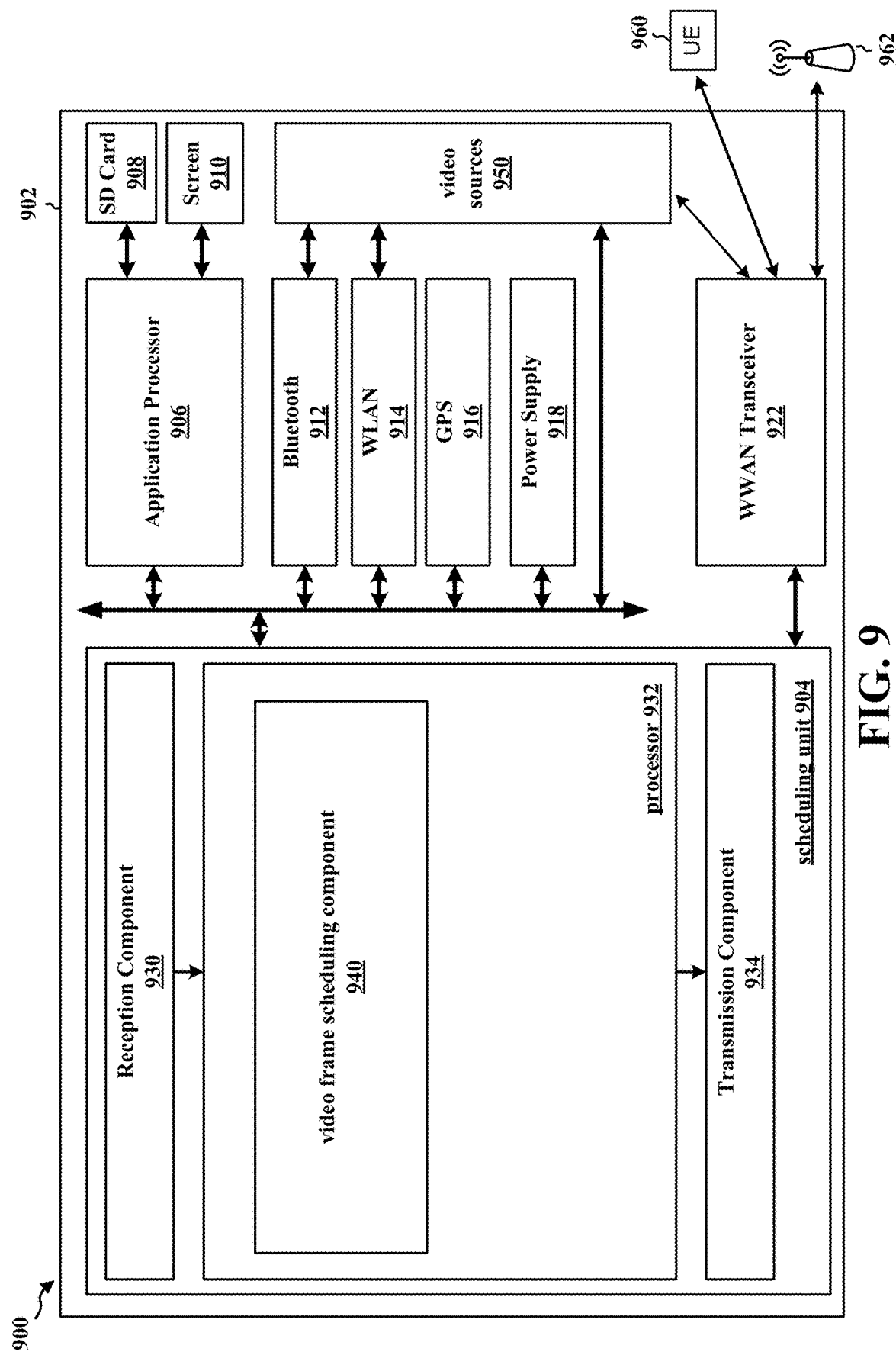
FIG. 9 is a diagram illustrating an example of a hardware implementation for an example apparatus.

FIG. 9 is diagram 900 illustrating an example of a hardware implementation for an apparatus 902. The apparatus 902 is a vehicle and includes a scheduling unit 904 (may also be referred to as a processor) coupled to a WWAN transceiver 922 and an application processor 906 coupled to a secure digital (SD) card 908, and a screen 910, a Bluetooth module 912, a wireless local area network (WLAN) module 914, a Global Positioning System (GPS) module 916, a power supply 918, and a plurality of video sources 950. The scheduling unit 904 communicates through the WWAN transceiver 922 with the UE 960 (e.g., another UE or vehicle 142), base station 962 (e.g., base station 140), and/or the plurality of video source 950. The scheduling unit 904 may schedule the resource allocations for the video sources 950 to transmit the video streams to the scheduling unit 904. The scheduling unit 904 may include a computer-readable medium/memory. The computer-readable medium/memory may be non-transitory. The scheduling unit 904 is responsible for general processing, including the execution of software stored on the computer-readable medium/memory. The software, when executed by the scheduling unit 904, causes the scheduling unit 904 to perform the various functions described supra. The computer-readable medium/memory may also be used for storing data that is manipulated by the scheduling unit 904 when executing software. The scheduling unit 904 further includes a reception component 930, a processor 932, and a transmission component 934. The processor 932 includes the one or more illustrated components. The components within the processor 932 may be stored in the computer-readable medium/memory and/or configured as hardware within the scheduling unit 904.

The processor 932 includes a video frame scheduling component 940 that is configured to schedule resource allocations for each video frame of a plurality of video frames of video streams from a plurality of video sources based on a compressed frame type of the video frame, determine that a first frame of a first video stream and a second frame of a second video stream are concurrently due for transmission at a first time slot, determine that the first video stream has a higher priority than the second video stream, determine that a total of time-frequency resources of the scheduled resource allocations for the first frame and the second frame concurrently due for transmission is greater than or equal to a threshold value, determine that the first frame has a higher frame priority than the second frame, schedule the resource allocations for the first frame of the first video stream at a first time slot, schedule the resource allocations for the second frame of the second video stream at a second time slot after the first time slot, cancel the transmission of the second frame of the second video stream, instruct the second video source to increase a video compression rate of the second video stream, receive the video streams from the plurality of video sources based on the scheduled resource allocations, e.g., as described in connection with 701, 702, 706, 708, 710, 711, 712, 714, 716, 718, and 720.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the scheduling unit 904, includes means for scheduling resource allocations for each video frame of a plurality of video frames of video streams from a plurality of video sources based on a compressed frame type of the video frame, and means for receiving the video streams from the plurality of video sources based on the scheduled resource allocations. The apparatus 902 includes means for determining that a first frame of a first video stream from a first video source and a second frame of a second video stream from a second video source are concurrently due for transmission, the first frame and the second frame having a same compressed frame type, and means for determining that the first video stream has a higher priority than the second video stream, and scheduling resource allocations for the first frame of the first video stream before the second frame of the second video stream based on the determination that the first video stream has a higher priority. The apparatus 902 includes means for determining that a total of time-frequency resources of the scheduled resource allocations for a first frame of a first video stream from a first video source and a second frame of a second video stream from a second video source concurrently due for transmission is greater than or equal to a threshold, means for determining which one of the first frame and the second frame has a higher frame priority, and means for scheduling resource allocations for one of the first frame or the second frame that has the higher frame priority before the other of the first frame or the second frame that has a lower frame priority. The apparatus 902 includes means for scheduling the resource allocations for the first frame of the first video stream in a first time slot based on the determination that the first video stream has a higher priority than the second video stream, means for scheduling the resource allocations for the second frame of the second video stream at a second time slot after the first time slot based on the determination that the first video stream has a higher priority than the second video stream, means for canceling the transmission of the second frame of the second video stream based on the determination that the first video stream has a higher priority than the second video stream, and means for instructing the second video source to increase a video compression rate of the second video stream based on the determination that the first video stream has a higher priority. The aforementioned means may be one or more of the aforementioned components of the apparatus 902 configured to perform the functions recited by the aforementioned means.

Referring again to FIGS. 1, 2, 3, 4, 5, 6, 7, 8, and 9, a video stream scheduling apparatus may be configured to schedule resource allocations for each video frame of a plurality of video frames of video streams from a plurality of video sources based on a compressed frame type of the video frame and receive the video streams from the plurality of video sources based on the scheduled resource allocations. The compressed frame type may include an I-frame, a P-frame, or a B-frame. In some aspects, the resource allocations may be scheduled to minimize a maximum sum of time-frequency resources associated with the resource allocations in each time slot of a set of time slots.

In some aspects, the video stream scheduling apparatus may be configured to schedule the resource allocations by determining that a first frame of a first video stream from a first video source and a second frame of a second video stream from a second video source are concurrently due for transmission, the first frame and the second frame having a same compressed frame type, and determining that the first video stream has a higher priority than the second video stream, and scheduling resource allocations for the first frame of the first video stream before the second frame of the second video stream based on the determination that the first video stream has a higher priority. In one aspect, the compressed frame type of the first frame and the second frame is each the I-frame. In some aspects, the video stream scheduling apparatus may determine the priorities of the first video stream and the second video stream based on at least one of a relative position of a vehicle; an operation of the vehicle including at least one of direction, velocity, or acceleration; an external environment of the vehicle including interference from other wireless devices; a location of the video source; a direction of reception of the video source relative to the vehicle; or a resolution of the video source.

In some aspects, the video stream scheduling apparatus may be configured to schedule the resource allocations by determining that a total of time-frequency resources of the scheduled resource allocations for a first frame of a first video stream from a first video source and a second frame of a second video stream from a second video source concurrently due for transmission is greater than or equal to a threshold, determining which one of the first frame and the second frame has a higher frame priority, and scheduling resource allocations for one of the first frame or the second frame that has the higher frame priority before the other of the first frame or the second frame that has a lower frame priority. In some aspects, the video stream scheduling apparatus may be configured to determine which one of the first frame and the second frame has a higher frame priority includes determining that the I-frame has a higher frame priority than the P-frame or the B-frame, and determining that the P-frame has a higher frame priority than the B-frame.

In one aspect, the video stream scheduling apparatus may further configured to schedule the resource allocations for the first frame of the first video stream in a first time slot based on the determination that the first video stream has a higher priority than the second video stream, and schedule the resource allocations for the second frame of the second video stream at a second time slot after the first time slot based on the determination that the first video stream has a higher priority than the second video stream. In another aspect, the video stream scheduling apparatus may be further configured to cancel the transmission of the second frame of the second video stream based on the determination that the first video stream has a higher priority than the second video stream. In another aspect, the video stream scheduling apparatus may be configured to instruct the second video source to increase a video compression rate of the second video stream based on the determination that the first video stream has a higher priority.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a video stream scheduling apparatus including at least one processor coupled to a memory, the at least one processor and the memory configured to schedule resource allocations for each video frame of a plurality of video frames of video streams from a plurality of video sources based on a compressed frame type of the video frame, the compressed frame type being one of an I-frame, a P-frame, or a B-frame, where the I-frame is independently compressed, the P-frame is a delta frame compressed in reference to a preceding I-frame or P-frame, and the B-frame is the delta frame compressed in reference to one or more neighboring I-frames and P-frames, and receive the video streams from the plurality of video sources based on the scheduled resource allocations.

Aspect 2 is the apparatus of aspect 1, where the at least one processor and the memory configured to schedule the resource allocations are further configured to determine that a first frame of a first video stream from a first video source and a second frame of a second video stream from a second video source are concurrently due for transmission, the first frame and the second frame having a same compressed frame type, and the video streams including the first video stream and the second video stream and the plurality of video sources including the first video source and the second video source, determine that the first video stream has a higher priority than the second video stream, and schedule resource allocations for the first frame of the first video stream before the second frame of the second video stream based on the determination that the first video stream has a higher priority.

Aspect 3 is the apparatus of aspect 2, where the compressed frame type of the first frame and the second frame is each the I-frame.

Aspect 4 is the apparatus of any of aspects 2 and 3, where the priorities of the first video stream and the second video stream are determined based on at least one of a relative position of a vehicle; an operation of the vehicle including at least one of direction, velocity, or acceleration; an external environment of the vehicle including interference from other wireless devices; a location of the video source; a direction of reception of the video source relative to the vehicle; or a resolution of the video source, where the resource allocations are scheduled further based on the determination of the priorities of the first video stream and the second video stream.

Aspect 5 is the apparatus of any of aspects 2 to 4, where the at least one processor and the memory configured to schedule the resource allocations are further configured to schedule the resource allocations for the first frame of the first video stream in a first time slot based on the determination that the first video stream has a higher priority than the second video stream, and schedule the resource allocations for the second frame of the second video stream at a second time slot after the first time slot based on the determination that the first video stream has a higher priority than the second video stream.

Aspect 6 is the apparatus of any of aspects 2 to 4, where the at least one processor and the memory configured to schedule the resource allocations are further configured to cancel the transmission of the second frame of the second video stream based on the determination that the first video stream has a higher priority than the second video stream.

Aspect 7 is the apparatus of any of aspects 2 to 4, where the at least one processor and the memory are further configured to instruct the second video source to increase a video compression rate of the second video stream based on the determination that the first video stream has a higher priority.

Aspect 8 is the apparatus of aspect 1, where the at least one processor and the memory configured to schedule the resource allocations are further configured to determine that a total of time-frequency resources of the scheduled resource allocations for a first frame of a first video stream from a first video source and a second frame of a second video stream from a second video source concurrently due for transmission is greater than or equal to a threshold, and the video streams include the first video stream and the second video stream and the plurality of video sources includes the first video source and the second video source, determine which one of the first frame and the second frame has a higher frame priority, and schedule resource allocations for one of the first frame or the second frame that has the higher frame priority before the other of the first frame or the second frame that has a lower frame priority.

Aspect 9 is the apparatus of aspect 8, where the at least one processor and the memory configured to determine which one of the first frame and the second frame has a higher frame priority are configured to determine that the I-frame has a higher frame priority than the P-frame or the B-frame, and determine that the P-frame has a higher frame priority than the B-frame.

Aspect 10 is the apparatus of any of aspects 8 and 9, where the at least one processor and the memory configured to schedule the resource allocations are further configured to schedule the resource allocations for the first frame of the first video stream in a first time slot based on the determination that the first frame has a higher frame priority than the second frame, and schedule the resource allocations for the second frame of the second video stream at a second time slot after the first time slot based on the determination that the first frame has a higher frame priority than the second frame.

Aspect 11 is the apparatus of any of aspects 8 and 9, where the at least one processor and the memory configured to schedule the resource allocations are further configured to cancel the transmission of the second frame of the second video stream based on the determination that the first frame has a higher frame priority than the second frame.

Aspect 12 is the apparatus of any of aspects 1 to 11, where the resource allocations are scheduled to minimize a maximum sum of time-frequency resources associated with the resource allocations in each time slot of a set of time slots.

Aspect 13 is a method of wireless communication for implementing any of aspects 1 to 12.

Aspect 14 is an apparatus for wireless communication, including means for implementing any of aspects 1 to 12.

Aspect 15 is a computer-readable medium storing computer-executable code, where the code when executed by a processor causes the processor to implement any of aspects 1 to 12.

What is claimed is:

1. An apparatus for wireless communication at a vehicle, comprising:
   memory; and
   at least one processor coupled to the memory, the at least one processor and the memory configured to:
      schedule time-frequency resource allocations for each video frame of a plurality of video frames of video streams from a plurality of cameras on the vehicle based on a compressed frame type of the video frame, a quality of service (QoS) associated with the video frame, and an overall frequency bandwidth of the plurality of video frames, the compressed frame type being one of an intra-frame (I-frame), a predictive frame (P-frame), or a bi-directional frame (B-frame), where the I-frame is independently compressed, the P-frame is a delta frame compressed in reference to a preceding I-frame or P-frame, and the B-frame is the delta frame compressed in reference to one or more neighboring I-frames and P-frames; and
      receive, from the plurality of cameras on the vehicle wirelessly, the video streams based on the scheduled time-frequency resource allocations.

2. The apparatus of claim 1, wherein the at least one processor and the memory configured to schedule the time-frequency resource allocations are further configured to:
   determine that a first frame of a first video stream from a first camera and a second frame of a second video stream from a second camera are concurrently due for transmission, the first frame and the second frame having a same compressed frame type, and the video streams including the first video stream and the second video stream and the plurality of cameras including the first camera and the second camera;
   determine that the first video stream has a higher priority than the second video stream, and
   schedule time-frequency resource allocations for the first frame of the first video stream before the second frame of the second video stream based on the determination that the first video stream has a higher priority.

3. The apparatus of claim 2, wherein the compressed frame type of the first frame and the second frame is each the I-frame.

4. The apparatus of claim 2, wherein the priorities of the first video stream and the second video stream are determined based on at least one of a relative position of a vehicle; an operation of the vehicle including at least one of direction, velocity, or acceleration; an external environment of the vehicle including interference from other wireless devices; a location of the camera; a direction of reception of the camera relative to the vehicle; or a resolution of the camera,
   wherein to schedule the time-frequency resource allocations, the at least one processor and the memory are configured to schedule the time-frequency resource allocations further based on the determination of the priorities of the first video stream and the second video stream.

5. The apparatus of claim 2, wherein the at least one processor and the memory configured to schedule the time-frequency resource allocations are further configured to:
   schedule the time-frequency resource allocations for the first frame of the first video stream in a first time slot based on the determination that the first video stream has a higher priority than the second video stream; and
   schedule the time-frequency resource allocations for the second frame of the second video stream at a second time slot after the first time slot based on the determination that the first video stream has a higher priority than the second video stream.

6. The apparatus of claim 2, wherein the at least one processor and the memory configured to schedule the time-frequency resource allocations are further configured to:
   cancel the transmission of the second frame of the second video stream based on the determination that the first video stream has a higher priority than the second video stream.

7. The apparatus of claim 2, wherein the at least one processor and the memory are further configured to:
   instruct the second camera to increase a video compression rate of the second video stream based on the determination that the first video stream has a higher priority.

8. The apparatus of claim 1, wherein the at least one processor and the memory configured to schedule the time-frequency resource allocations are further configured to:
   determine that a total of time-frequency resources of the scheduled time-frequency resource allocations for a first frame of a first video stream from a first camera and a second frame of a second video stream from a second camera concurrently due for transmission is greater than or equal to a threshold, and the video streams include the first video stream and the second video stream and the plurality of cameras includes the first camera and the second camera;
   determine which one of the first frame and the second frame has a higher frame priority; and
   schedule the time-frequency resource allocations for the one of the first frame or the second frame that has the higher frame priority before the other of the first frame or the second frame that has a lower frame priority.

9. The apparatus of claim 8, wherein the at least one processor and the memory configured to determine which one of the first frame and the second frame has a higher frame priority are configured to:
- determine that the I-frame has a higher frame priority than the P-frame or the B-frame; and
- determine that the P-frame has a higher frame priority than the B-frame.

10. The apparatus of claim 8, wherein the at least one processor and the memory configured to schedule the time-frequency resource allocations are further configured to:
- schedule the time-frequency resource allocations for the first frame of the first video stream in a first time slot based on the determination that the first frame has a higher frame priority than the second frame; and
- schedule the time-frequency resource allocations for the delta frame of the second video stream at a second time slot after the first time slot based on the determination that the first frame has a higher frame priority than the second frame.

11. The apparatus of claim 8, wherein the at least one processor and the memory configured to schedule the time-frequency resource allocations are further configured to:
- cancel the transmission of the second frame of the second video stream based on the determination that the first frame has a higher frame priority than the second frame.

12. The apparatus of claim 1, wherein to schedule the time-frequency resource allocations, the at least one processor and the memory are configured to schedule the time-frequency resource allocations to minimize a maximum sum of time-frequency resources associated with the time-frequency resource allocations in each time slot of a set of time slots.

13. The apparatus of claim 1, wherein different video streams have different stream pattern, and wherein I-frames of different cameras on the vehicle are scheduled on different time slots.

14. A method of wireless communication at a vehicle, comprising:
- scheduling time-frequency resource allocations for each video frame of a plurality of video frames of video streams from a plurality of cameras based on a compressed frame type of the video frame, a quality of service (QoS) associated with the video frame, and an overall frequency bandwidth of the plurality of video frames, the compressed frame type being one of an intra-frame (I-frame), a predictive frame (P-frame), or a bi-directional frame (B-frame), where the I-frame is independently compressed, the P-frame is a delta frame compressed in reference to a preceding I-frame or P-frame, and the B-frame is the delta frame compressed in reference to one or more neighboring I-frames and P-frames; and
- receiving, from the plurality of cameras on the vehicle wirelessly, the video streams based on the scheduled time-frequency resource allocations.

15. The method of claim 14, wherein the scheduling the time-frequency resource allocations comprises:
- determining that a first frame of a first video stream from a first camera and a second frame of a second video stream from a second camera are concurrently due for transmission, the first frame and the second frame having a same compressed frame type, and the video streams including the first video stream and the second video stream and the plurality of cameras including the first camera and the second camera;
- determining that the first video stream has a higher priority than the second video stream; and
- scheduling time-frequency resource allocations for the first frame of the first video stream before the second frame of the second video stream based on the determination that the first video stream has a higher priority.

16. The method of claim 15, wherein the compressed frame type of the first frame and the second frame is each the I-frame.

17. The method of claim 15, wherein the priorities of the first video stream and the second video stream are determined based on at least one of a relative position of a vehicle; an operation of the vehicle including at least one of direction, velocity, or acceleration; an external environment of the vehicle including interference from other wireless devices; a location of the camera; a direction of reception of the camera relative to the vehicle; or a resolution of the camera,
- wherein the time-frequency resource allocations are scheduled further based on the determination of the priorities of the first video stream and the second video stream.

18. The method of claim 15, wherein the scheduling the time-frequency resource allocations further comprises:
- scheduling the time-frequency resource allocations for the first frame of the first video stream in a first time slot based on the determination that the first video stream has a higher priority than the second video stream; and
- scheduling the time-frequency resource allocations for the second frame of the second video stream at a second time slot after the first time slot based on the determination that the first video stream has a higher priority than the second video stream.

19. The method of claim 15, wherein the scheduling the time-frequency resource allocations further comprises:
- canceling the transmission of the second frame of the second video stream based on the determination that the first video stream has a higher priority than the second video stream.

20. The method of claim 15, further comprising instructing the second camera to increase a video compression rate of the second video stream based on the determination that the first video stream has a higher priority.

21. The method of claim 14, wherein the scheduling the time-frequency resource allocations comprises:
- determining that a total of time-frequency resources of the scheduled time-frequency resource allocations for a first frame of a first video stream from a first camera and a second frame of a second video stream from a second camera concurrently due for transmission is greater than or equal to a threshold, and the video streams include the first video stream and the second video stream and the plurality of cameras includes the first camera and the second camera;
- determining which one of the first frame and the second frame has a higher frame priority; and
- scheduling the time-frequency resource allocations for one of the first frame or the second frame that has the higher frame priority before the other of the first frame or the second frame that has a lower frame priority.

22. The method of claim 21, wherein the determining which one of the first frame and the second frame has a higher frame priority comprises:
- determining that the I-frame has a higher frame priority than the P-frame or the B-frame; and determining that the P-frame has a higher frame priority than the B-frame.

23. The method of claim 21, wherein the scheduling the time-frequency resource allocations further comprises:
scheduling the time-frequency resource allocations for the first frame of the first video stream in a first time slot based on the determination that the first frame has a higher frame priority than the second frame; and
scheduling the time-frequency resource allocations for the second frame of the second video stream at a second time slot after the first time slot based on the determination that the first frame has a higher frame priority than the second frame.

24. The method of claim 21, wherein the scheduling the time-frequency resource allocations further comprises:
canceling the transmission of the second frame of the second video stream based on the determination that the first frame has a higher frame priority than the second frame.

25. The method of claim 14, wherein the time-frequency resource allocations are scheduled to minimize a maximum sum of time-frequency resources associated with the time-frequency resource allocations in each time slot of a set of time slots.

26. An apparatus for wireless communication at a vehicle, comprising:
means for scheduling time-frequency resource allocations for each video frame of a plurality of video frames of video streams from a plurality of cameras based on a compressed frame type of the video frame, a quality of service (QoS) associated with the video frame, and an overall frequency bandwidth of the plurality of video frames, the compressed frame type being one of an intra-frame (I-frame), a predictive frame (P-frame), or a bi-directional frame (B-frame), where the I-frame is independently compressed, the P-frame is a delta frame compressed in reference to a preceding I-frame or P-frame, and the B-frame is the delta frame compressed in reference to one or more neighboring I-frames and P-frames; and
means for receiving, from the plurality of cameras on the vehicle wirelessly, the video streams based on the scheduled time-frequency resource allocations.

27. The apparatus of claim 26, wherein the means for scheduling the time-frequency resource allocations further comprises:
means for determining that a first frame of a first video stream from a first camera and a second frame of a second video stream from a second camera are concurrently due for transmission, the first frame and the second frame having a same compressed frame type, and the video streams including the first video stream and the second video stream and the plurality of cameras including the first camera and the second camera;
means for determining that the first video stream has a higher priority than the second video stream; and
means for scheduling time-frequency resource allocations for the first frame of the first video stream before the second frame of the second video stream based on the determination that the first video stream has a higher priority.

28. The apparatus of claim 27, wherein the priorities of the first video stream and the second video stream are determined based on at least one of a relative position of a vehicle; an operation of the vehicle including at least one of direction, velocity, or acceleration; an external environment of the vehicle including interference from other wireless devices; a location of the camera; a direction of reception of the camera relative to the vehicle; or a resolution of the camera,
wherein the time-frequency resource allocations are scheduled further based on the determination of the priorities of the first video stream and the second video stream.

29. The apparatus of claim 26, wherein the means for scheduling the time-frequency resource allocations further comprises:
means for determining that a total of time-frequency resources of the scheduled time-frequency resource allocations for a first frame of a first video stream from a first camera and a second frame of a second video stream from a second camera concurrently due for transmission is greater than or equal to a threshold, and the video streams include the first video stream and the second video stream and the plurality of cameras includes the first camera and the second camera;
means for determining which one of the first frame and the second frame has a higher frame priority; and
means for scheduling time-frequency resource allocations for one of the first frame or the second frame that has the higher frame priority before the other of the first frame or the second frame that has a lower frame priority.

30. The apparatus of claim 29, wherein the means for scheduling the time-frequency resource allocations is configured to determine which one of the first frame and the second frame has a higher frame priority further comprises:
means for determining that the I-frame has a higher frame priority than the P-frame or the B-frame; and
means for determining that the P-frame has a higher frame priority than the B-frame.

31. A non-transitory computer-readable medium storing computer-executable code at a vehicle, the code when executed by a processor causes the processor to:
schedule time-frequency resource allocations for each video frame of a plurality of video frames of video streams from a plurality of cameras based on a compressed frame type of the video frame, a quality of service (QoS) associated with the video frame, and an overall frequency bandwidth of the plurality of video frames, the compressed frame type being one of an intra-frame (I-frame), a predictive frame (P-frame), or a bi-directional frame (B-frame), where the I-frame is independently compressed, the P-frame is a delta frame compressed in reference to a preceding I-frame or P-frame, and the B-frame is the delta frame compressed in reference to one or more neighboring I-frames and P-frames; and
receive, from the plurality of cameras on the vehicle wirelessly, the video streams based on the scheduled resource allocations.

* * * * *